United States Patent
Long et al.

(10) Patent No.: US 9,772,032 B2
(45) Date of Patent: Sep. 26, 2017

(54) HYDRAULIC SYSTEM AND METHOD FOR A HYBRID VEHICLE

(71) Applicant: Allison Transmission, Inc., Indianapolis, IN (US)

(72) Inventors: Charles F. Long, Pittsboro, IN (US); Charles T. Taylor, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 302 days.

(21) Appl. No.: 14/626,024

(22) Filed: Feb. 19, 2015

(65) Prior Publication Data

US 2015/0167836 A1    Jun. 18, 2015

Related U.S. Application Data

(63) Continuation of application No. 13/736,347, filed on Jan. 8, 2013, now Pat. No. 9,108,499, which is a
(Continued)

(51) Int. Cl.
*F16H 61/02* (2006.01)
*F16H 61/00* (2006.01)
(Continued)

(52) U.S. Cl.
CPC .......... *F16H 61/0021* (2013.01); *B60K 6/12* (2013.01); *B60K 6/20* (2013.01); *B60K 6/36* (2013.01); *B60K 6/48* (2013.01); *F16D 25/14* (2013.01); *F16H 61/0025* (2013.01); *F16H 61/0031* (2013.01); *F16H 61/0206* (2013.01);
(Continued)

(58) Field of Classification Search
CPC ............. F16H 61/0206; F16H 61/0025; F16H 61/0031; F16H 2061/0209; F16H 61/02
See application file for complete search history.

(56) References Cited

U.S. PATENT DOCUMENTS 2,012,082 A  8/1935  Hieber et al.
2,374,822 A  5/1945  Claire
(Continued)

FOREIGN PATENT DOCUMENTS

DE          3519026      4/1986
DE   10 2005 015911 A1  10/2006
(Continued)

OTHER PUBLICATIONS

European Search Report dated Oct. 8, 2014 EP12802017.9.
(Continued)

*Primary Examiner* — Huan Le
(74) *Attorney, Agent, or Firm* — Woodard Emhardt Moriarty McNett & Henry LLP

(57) ABSTRACT

A hydraulic system for a hybrid module which is located between an engine and a transmission includes a parallel arrangement of a mechanical pump and an electric pump. Each pump is constructed and arranged to deliver oil to other portions of the hydraulic system depending on the operational mode. Three operational modes are described including an electric mode, a transition mode, and a cruise mode. Various monitoring and control features are incorporated into the hydraulic system.

35 Claims, 19 Drawing Sheets

Related U.S. Application Data continuation of application No. PCT/US2012/025451, filed on Feb. 16, 2012.

(60) Provisional application No. 61/443,750, filed on Feb. 17, 2011.

(51) Int. Cl.

| | | |
|---|---|---|
| *B60K 6/48* | (2007.10) | |
| *B60K 6/12* | (2006.01) | |
| *B60K 6/20* | (2007.10) | |
| *F16D 48/02* | (2006.01) | |
| *B60K 6/36* | (2007.10) | |
| *F16K 31/06* | (2006.01) | |
| *G05D 7/06* | (2006.01) | |

(52) U.S. Cl.
CPC ....... *F16K 31/0644* (2013.01); *G05D 7/0652* (2013.01); *B60Y 2200/92* (2013.01); *F16H 2061/0037* (2013.01); *Y02T 10/6221* (2013.01); *Y10S 903/902* (2013.01); *Y10S 903/903* (2013.01); *Y10S 903/915* (2013.01); *Y10T 137/8593* (2015.04); *Y10T 137/85986* (2015.04); *Y10T 137/86131* (2015.04)

(56) References Cited

U.S. PATENT DOCUMENTS

| | | |
|---|---|---|
| 2,759,608 A | 8/1956 | Miller |
| 3,025,718 A | 3/1962 | Christenson |
| 3,334,705 A | 8/1967 | Lam |
| 3,800,913 A | 4/1974 | Schmitt |
| 3,863,739 A | 2/1975 | Schaefer et al. |
| 4,584,487 A | 4/1986 | Hesse et al. |
| 4,838,126 A | 6/1989 | Wilfinger et al. |
| 5,019,757 A | 5/1991 | Beifus |
| 5,121,714 A | 6/1992 | Susa et al. |
| 5,209,110 A | 5/1993 | Sano et al. |
| 5,217,085 A | 6/1993 | Barrie et al. |
| 5,251,440 A | 10/1993 | Bong-dong et al. |
| 5,347,821 A | 9/1994 | Oltman et al. |
| 5,362,206 A | 11/1994 | Westerman et al. |
| 5,415,603 A | 5/1995 | Tuzuki et al. |
| 5,447,414 A | 9/1995 | Nordby et al. |
| 5,606,946 A | 3/1997 | Data et al. |
| 5,651,391 A | 7/1997 | Connolly et al. |
| 5,669,464 A | 9/1997 | Earleson |
| 5,724,878 A | 3/1998 | Stolle et al. |
| 5,736,823 A | 4/1998 | Nordby et al. |
| 5,752,482 A | 5/1998 | Roettgen et al. |
| 5,823,282 A | 10/1998 | Yamaguchi |
| 5,890,509 A | 4/1999 | Becker et al. |
| 5,895,099 A | 4/1999 | Diecke et al. |
| 5,944,632 A | 8/1999 | Hara et al. |
| 6,082,322 A | 7/2000 | Graham |
| 6,172,602 B1 | 1/2001 | Hasfjord |
| 6,209,672 B1 | 4/2001 | Severinsky |
| 6,244,825 B1 | 6/2001 | Sasaki et al. |
| 6,292,731 B1 | 9/2001 | Kirchhoffer et al. |
| 6,305,664 B1 | 10/2001 | Holmes et al. |
| 6,390,947 B1 | 5/2002 | Aoki et al. |
| 6,527,074 B1 | 3/2003 | Morishita |
| 6,607,142 B1 | 8/2003 | Boggs et al. |
| 6,638,022 B2 | 10/2003 | Shimabukuro et al. |
| 6,647,326 B2 | 11/2003 | Nakamori et al. |
| 6,716,138 B2 | 4/2004 | Matsubara et al. |
| 7,041,030 B2 | 5/2006 | Kuroda et al. |
| 7,055,486 B2 | 6/2006 | Hoff et al. |
| 7,082,758 B2 | 8/2006 | Kageyama et al. |
| 7,117,120 B2 | 10/2006 | Beck et al. |
| 7,168,924 B2 | 1/2007 | Beck et al. |
| 7,174,876 B2 | 2/2007 | Suzuki et al. |
| 7,192,518 B2 | 3/2007 | Roesgen |
| 7,255,214 B2 | 8/2007 | Long et al. |
| 7,285,066 B2 | 10/2007 | Long et al. |
| 7,288,039 B2 | 10/2007 | Foster et al. |
| 7,396,306 B2 | 7/2008 | Long et al. |
| 7,427,914 B2 | 9/2008 | Plantamura |
| 7,481,053 B2 | 1/2009 | Kitano et al. |
| 7,543,695 B2 | 6/2009 | Redelman et al. |
| 7,556,120 B2 | 7/2009 | Sah et al. |
| 7,558,699 B2 | 7/2009 | Beck et al. |
| 7,651,427 B2 | 1/2010 | Long et al. |
| 7,779,958 B2 | 8/2010 | Kitano et al. |
| 7,946,389 B2 | 5/2011 | Kakinami et al. |
| 2002/0177960 A1 | 11/2002 | Berndorfer |
| 2003/0059310 A1 | 3/2003 | Koenig et al. |
| 2004/0062658 A1 | 4/2004 | Beck et al. |
| 2004/0192502 A1 | 9/2004 | Suzuki et al. |
| 2005/0031443 A1 | 2/2005 | Ohlsson et al. |
| 2005/0064975 A1 | 3/2005 | Takagi et al. |
| 2005/0256626 A1 | 11/2005 | Hsieh et al. |
| 2007/0173373 A1* | 7/2007 | Kinugasa ........... B60K 6/36 477/3 |
| 2007/0240919 A1 | 10/2007 | Carlson |
| 2007/0284176 A1 | 12/2007 | Sah et al. |
| 2008/0017472 A1 | 1/2008 | Redelman et al. |
| 2008/0067116 A1 | 3/2008 | Anderson et al. |
| 2008/0121464 A1 | 5/2008 | Ledger et al. |
| 2008/0260541 A1 | 10/2008 | Lifson et al. |
| 2009/0014245 A1 | 1/2009 | Shevchenko et al. |
| 2009/0107755 A1 | 4/2009 | Kothari et al. |
| 2009/0116155 A1 | 5/2009 | Almalki et al. |
| 2009/0118878 A1 | 5/2009 | Park |
| 2009/0235657 A1 | 9/2009 | Rampen et al. |
| 2009/0247353 A1 | 10/2009 | Tryon et al. |
| 2009/0247355 A1* | 10/2009 | Tryon ........... F16H 61/0031 477/52 |
| 2009/0253544 A1 | 10/2009 | Foster et al. |
| 2009/0253552 A1 | 10/2009 | Foster |
| 2009/0259381 A1 | 10/2009 | Wilson et al. |
| 2009/0276119 A1 | 11/2009 | Barker et al. |
| 2010/0083730 A1 | 4/2010 | Le et al. |
| 2010/0125023 A1 | 5/2010 | List et al. |
| 2010/0229824 A1 | 9/2010 | Matsuo et al. |
| 2010/0332089 A1 | 12/2010 | Gianone et al. |
| 2011/0000332 A1 | 1/2011 | Gianone et al. |
| 2011/0039657 A1 | 2/2011 | Gibson et al. |
| 2011/0135500 A1 | 6/2011 | Kaimer et al. |
| 2013/0018605 A1 | 1/2013 | Peterson |

FOREIGN PATENT DOCUMENTS

| | | |
|---|---|---|
| DE | 10 2007 004964 A1 | 8/2008 |
| EP | 0515326 | 11/1992 |
| GB | 1471305 | 4/1977 |
| GB | 2 046 376 A | 11/1980 |
| GB | 2402720 | 2/2007 |
| JP | 56-003307 A | 1/1981 |
| JP | 2000337119 A | 5/2000 |
| JP | 2004-067001 | 3/2004 |
| KR | 2005038168 | 4/2005 |
| KR | 10-1039579 B1 | 6/2011 |

OTHER PUBLICATIONS

European Supplemental Search Report for European Patent Application No. 12757971.2 dated Aug. 4, 2014.
International Search Report and Written Opinion issued in PCT/US2012/024119, dated Aug. 22, 2012.
International Search Report and Written Opinion issued in PCT/US2012/025457, dated Dec. 26, 2012.
International Search Report and Written Opinion issued in PCT/US2012/027847, dated Sep. 26, 2012.
International Search Report and Written Opinion issued in PCT/US2012/043432, dated Oct. 23, 2012.
Search Report and Written Opinion issued in PCT/US2012/025451, dated Aug. 27, 2012.

* cited by examiner

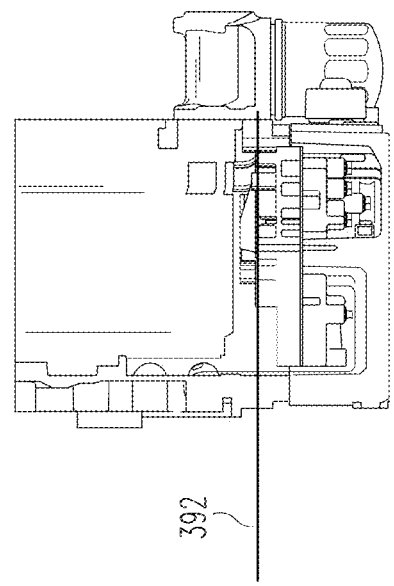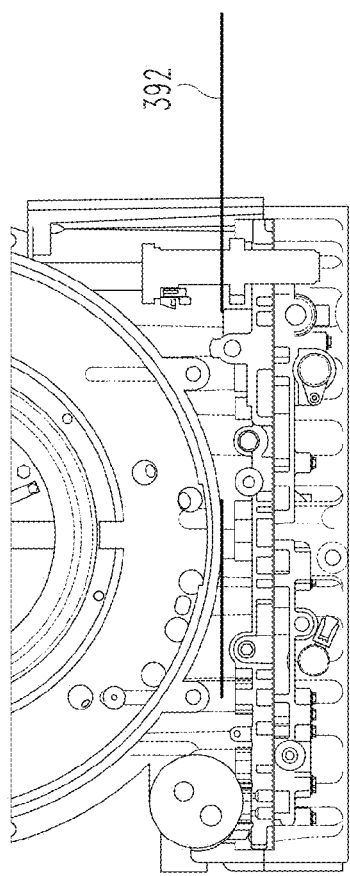

HYDRAULIC SYSTEM AND METHOD FOR A HYBRID VEHICLE

CROSS REFERENCE TO RELATED APPLICATION

This application is a continuation of U.S. patent application Ser. No. 13/736,347 filed Jan. 8, 2013, which is a continuation of PCT Application No. PCT/US2012/025451, filed Feb. 16, 2012, which claims the benefit of U.S. Patent Application Ser. No. 61/443,750 filed Feb. 17, 2011, all of which are hereby incorporated by reference.

BACKGROUND OF THE INVENTION

With the growing concern over global climate change as well as oil supplies, there has been a recent trend to develop various hybrid systems for motor vehicles. While numerous hybrid systems have been proposed, the systems typically require significant modifications to the drive trains of the vehicles. These modifications make it difficult to retrofit the systems to existing vehicles. Moreover, some of these systems have a tendency to cause significant power loss, which in turn hurts the fuel economy for the vehicle. Thus, there is a need for improvement in this field.

One of the areas for improvement is in the construction and arrangement of the hydraulic system. Hybrid vehicles, and in particular the hybrid module associated with such a vehicle, have various lubrication and cooling needs which depend on engine conditions and operational modes. In order to address these needs, oil is delivered by at least one hydraulic pump. The operation of each hydraulic pump is controlled, based in part on the lubrication and cooling needs and based in part on the prioritizing when one or more hydraulic pump is included as part of the hydraulic system of the hybrid vehicle. The prioritizing between hydraulic pumps is based in part on the needs and based in part on the operational state or mode of the hybrid vehicle.

SUMMARY

The hydraulic system (and method) described herein is part of a hybrid module used within a hybrid system adapted for use in vehicles and suitable for use in transportation systems and into other environments. The cooperating hybrid system is generally a self-contained and self-sufficient system which is able to function without the need to significantly drain resources from other systems in the corresponding vehicle or transportation system. The hybrid module includes an electric machine (eMachine).

This self-sufficient design in turn reduces the amount of modifications needed for other systems, such as the transmission and lubrication systems, because the capacities of the other systems do not need to be increased in order to compensate for the increased workload created by the hybrid system. For instance, the hybrid system incorporates its own lubrication and cooling systems that are able to operate independently of the transmission and the engine. The fluid circulation system which can act as a lubricant, hydraulic fluid, and/or coolant, includes a mechanical pump for circulating a fluid, along with an electric pump that supplements the workload for the mechanical pump when needed. As will be explained in further detail below, this dual mechanical/electric pump system helps to reduce the size and weight of the required mechanical pump, and if desired, also allows the system to run in a complete electric mode in which the electric pump solely circulates the fluid.

More specifically, the described hydraulic system (for purposes of the exemplary embodiment) is used in conjunction with a hybrid electric vehicle (HEV). Included as part of the described hydraulic system is a parallel arrangement of a mechanical oil pump and an electric oil pump. The control of each pump and the sequence of operation of each pump depends in part on the operational state or the mode of the hybrid vehicle. Various system modes are described herein relating to the hybrid vehicle. As for the hydraulic system disclosed herein, there are three modes which are specifically described and these three modes include an electric mode (EMode), a transition mode, and a cruise mode.

As will be appreciated from the description which follows, the described hydraulic system (and method) is constructed and arranged for addressing the need for component lubrication and for cooling those portions of the hybrid module which experience an elevated temperature during operation of the vehicle. The specific construction and operational characteristics provide an improved hydraulic system for a hydraulic module.

The compact design of the hybrid module has placed demands and constraints on a number of its subcomponents, such as its hydraulics and the clutch. To provide an axially compact arrangement, the piston for the clutch has a recess in order to receive a piston spring that returns the piston to a normally disengaged position. The recess for the spring in the piston creates an imbalance in the opposing surface areas of the piston. This imbalance is exacerbated by the high centrifugal forces that cause pooling of the fluid, which acts as the hydraulic fluid for the piston. As a result, a nonlinear relationship for piston pressure is formed that makes accurate piston control extremely difficult. To address this issue, the piston has an offset section so that both sides of the piston have the same area and diameter. With the areas being the same, the operation of the clutch can be tightly and reliably controlled. The hydraulics for the clutch also incorporate a spill over feature that reduces the risk of hydrostatic lock, while at the same time ensures proper filling and lubrication.

In addition to acting as the hydraulic fluid for the clutch, the hydraulic fluid also acts as a coolant for the eMachine as well as other components. The hybrid module includes a sleeve that defines a fluid channel that encircles the eMachine for cooling purposes. The sleeve has a number of spray channels that spray the fluid from the fluid channel onto the windings of the stator, thereby cooling the windings, which tend to generally generate the majority of the heat for the eMachine. The fluid has a tendency to leak from the hybrid module and around the torque converter. To prevent power loss of the torque converter, the area around the torque converter should be relatively dry, that is, free from the fluid. To keep the fluid from escaping and invading the torque converter, the hybrid module includes a dam and slinger arrangement. Specifically, the hybrid module has a impeller blade that propels the fluid back into the eMachine through a window or opening in a dam member. Subsequently, the fluid is then drained into the sump so that it can be scavenged and recirculated.

The hybrid module has a number of different operational modes. During the start mode, the battery supplies power to the eMachine as well as to the electric pump. Once the pump achieves the desired oil pressure, the clutch piston is stroked to apply the clutch. With the clutch engaged, the eMachine applies power to start the engine. During the electro-propulsion only mode the clutch is disengaged, and only the eMachine is used to power the torque converter. In the propulsion assist mode, the engine's clutch is engaged, and the eMachine acts as a motor in which both the engine and eMachine drive the torque converter. While in a propulsion-charge mode, the clutch is engaged, and the internal combustion engine solely drives the vehicle. The eMachine is operated in a generator mode to generate electricity that is stored in the energy storage system. The hybrid module can also be used to utilize regenerative braking (i.e., regenerative charging). During regenerative braking, the engine's clutch is disengaged, and the eMachine operates as a generator to supply electricity to the energy storage system. The system is also designed for engine compression braking, in which case the engine's clutch is engaged, and the eMachine operates as a generator as well.

In addition, the system is also designed to utilize both power takeoff (PTO) and electronic PTO (ePTO) modes in order to operate ancillary equipment such as cranes, refrigeration systems, hydraulic lifts, and the like. In a normal PTO mode, the clutch and the PTO system are engaged, and the internal combustion engine is then used to power the ancillary equipment. In an ePTO state, the clutch is disengaged and the eMachine acts as a motor to power the ancillary equipment via the PTO. While in the PTO or ePTO operational modes, the transmission can be in neutral or in gear, depending on the requirements.

Further forms, objects, features, aspects, benefits, advantages, and embodiments of the present invention will become apparent from a detailed description and drawings provided herewith.

BRIEF DESCRIPTION OF THE DRAWINGS

FIG. 13A is a partial, front elevational view of the FIG. 7 combination showing a desired oil level.

FIG. 13B is a partial, side elevational view of the FIG. 7 combination showing the desired oil level.

DETAILED DESCRIPTION

Figure 1:
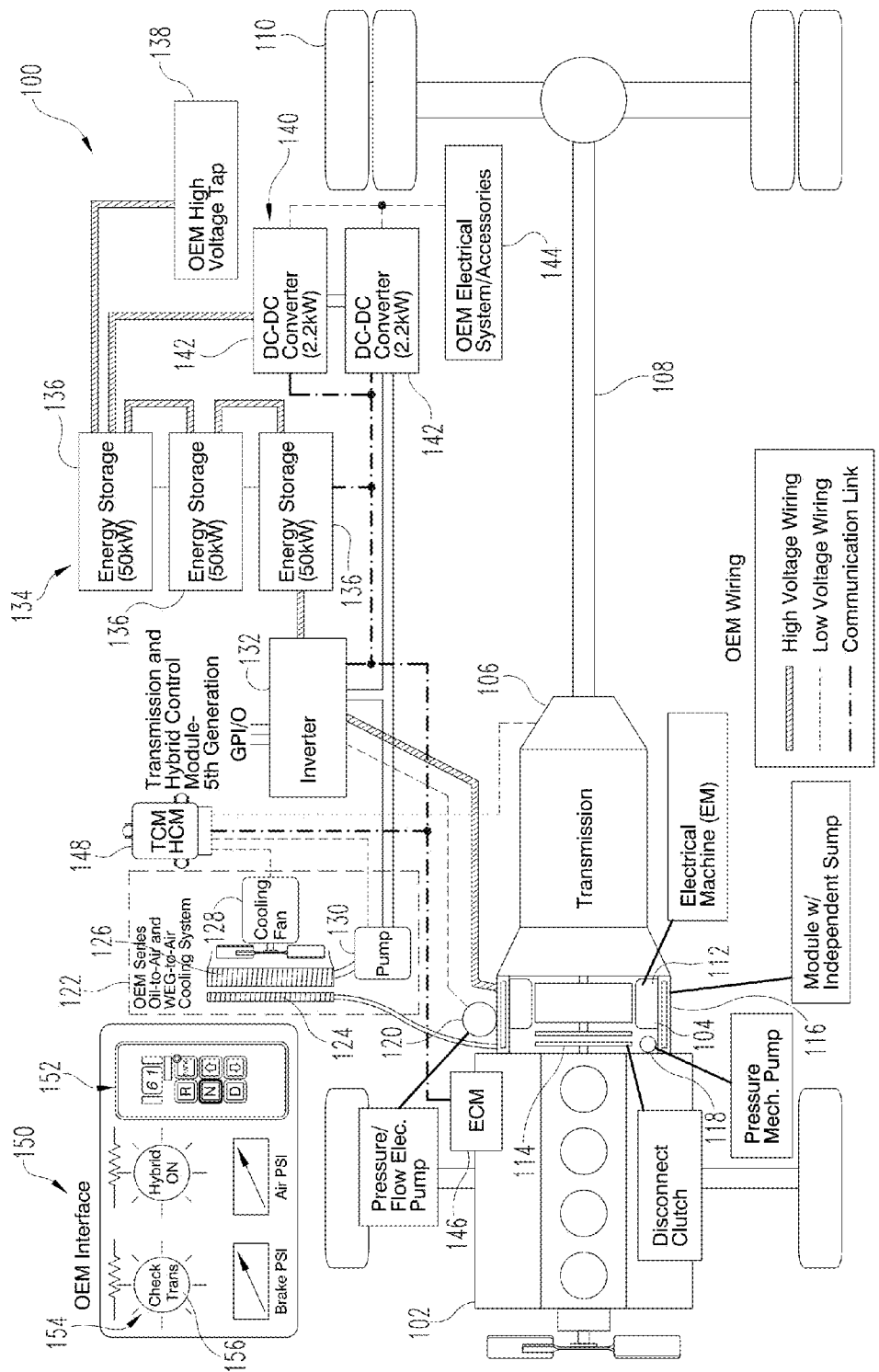
FIG. 1 illustrates a diagrammatic view of one example of a hybrid system.

For the purposes of promoting an understanding of the disclosure, reference will now be made to the embodiments illustrated in the drawings and specific language will be used to describe the same. It will nevertheless be understood that no limitation of the scope of the disclosure is thereby intended, such alterations and further modifications in the illustrated device and its use, and such further applications of the principles of the disclosure as illustrated therein being contemplated as would normally occur to one skilled in the art to which the disclosure relates.

FIG. 1 shows a diagrammatic view of a hybrid system 100 according to one embodiment. The hybrid system 100 illustrated in FIG. 1 is adapted for use in commercial-grade trucks as well as other types of vehicles or transportation systems, but it is envisioned that various aspects of the hybrid system 100 can be incorporated into other environments. As shown, the hybrid system 100 includes an engine 102, a hybrid module 104, an automatic transmission 106, and a drive train 108 for transferring power from the transmission 106 to wheels 110. The hybrid module 104 incorporates an electrical machine, commonly referred to as an eMachine 112, and a clutch 114 that operatively connects and disconnects the engine 102 with the eMachine 112 and the transmission 106.

The hybrid module 104 is designed to operate as a self-sufficient unit, that is, it is generally able to operate independently of the engine 102 and transmission 106. In particular, its hydraulics, cooling and lubrication do not directly rely upon the engine 102 and the transmission 106. The hybrid module 104 includes a sump 116 that stores and supplies fluids, such as oil, lubricants, or other fluids, to the hybrid module 104 for hydraulics, lubrication, and cooling purposes. While the terms oil or lubricant or lube will be used interchangeably herein, these terms are used in a broader sense to include various types of lubricants, such as natural or synthetic oils, as well as lubricants having different properties. To circulate the fluid, the hybrid module 104 includes a mechanical pump 118 and an electric pump 120 in cooperation with a hydraulic system 200 (see FIG. 2). With this parallel combination of the mechanical pump 118 and the electric pump 120, there are opportunities to possibly reduce the overall size and perhaps the total cost for the pumps. The electric pump 120 cooperates with the mechanical pump 118 to provide extra pumping capacity when required. The electric pump 120 is also used for hybrid system needs when there is no drive input to operate the mechanical pump 118. In addition, it is contemplated that the flow through the electric pump 120 can be used to detect low fluid conditions for the hybrid module 104.

The hybrid system 100 further includes a cooling system 122 that is used to cool the fluid supplied to the hybrid module 104 as well as the water-ethylene-glycol (WEG) to various other components of the hybrid system 100. In one variation, the WEG can also be circulated through an outer jacket of the eMachine 112 in order to cool the eMachine 112. Although the hybrid system 100 has been described with respect to a WEG coolant, other types of antifreezes and cooling fluids, such as water, alcohol solutions, etc., can be used. With continued reference to FIG. 1, the cooling system 122 includes a fluid radiator 124 that cools the fluid for the hybrid module 104. The cooling system 122 further includes a main radiator 126 that is configured to cool the antifreeze for various other components in the hybrid system 100. Usually, the main radiator 126 is the engine radiator in most vehicles, but the main radiator 126 does not need to be the engine radiator. A cooling fan 128 flows air through both fluid radiator 124 and main radiator 126. A circulating or coolant pump 130 circulates the antifreeze to the main radiator 126. It should be recognized that other various components besides the ones illustrated can be cooled using the cooling system 122. For instance, the transmission 106 and/or the engine 102 can be cooled as well via the cooling system 122.

The eMachine 112 in the hybrid module 104, depending on the operational mode, at times acts as a generator and at other times as a motor. When acting as a motor, the eMachine 112 draws alternating current (AC). When acting as a generator, the eMachine 112 creates AC. An inverter 132 converts the AC from the eMachine 112 and supplies it to an energy storage system 134. In the illustrated example, the energy storage system 134 stores the energy and resupplies it as direct current (DC). When the eMachine 112 in the hybrid module 104 acts as a motor, the inverter 132 converts the DC power to AC, which in turn is supplied to the eMachine 112. The energy storage system 134 in the illustrated example includes three energy storage modules 136 that are daisy-chained together to supply high voltage power to the inverter 132. The energy storage modules 136 are, in essence, electrochemical batteries for storing the energy generated by the eMachine 112 and rapidly supplying the energy back to the eMachine 112. The energy storage modules 136, the inverter 132, and the eMachine 112 are operatively coupled together through high voltage wiring as is depicted by the line illustrated in FIG. 1. While the illustrated example shows the energy storage system 134 including three energy storage modules 136, it should be recognized that the energy storage system 134 can include more or less energy storage modules 136 than is shown. Moreover, it is envisioned that the energy storage system 134 can include any system for storing potential energy, such as through chemical means, pneumatic accumulators, hydraulic accumulators, springs, thermal storage systems, flywheels, gravitational devices, and capacitors, to name just a few examples.

High voltage wiring connects the energy storage system 134 to a high voltage tap 138. The high voltage tap 138 supplies high voltage to various components attached to the vehicle. A DC-DC converter system 140, which includes one or more DC-DC converter modules 142, converts the high voltage power supplied by the energy storage system 134 to a lower voltage, which in turn is supplied to various systems and accessories 144 that require lower voltages. As illustrated in FIG. 1, low voltage wiring connects the DC-DC converter modules 142 to the low voltage systems and accessories 144.

The hybrid system 100 incorporates a number of control systems for controlling the operations of the various components. For example, the engine 102 has an engine control module (ECM) 146 that controls various operational characteristics of the engine 102 such as fuel injection and the like. A transmission/hybrid control module (TCM/HCM) 148 substitutes for a traditional transmission control module and is designed to control both the operation of the transmission 106 as well as the hybrid module 104. The transmission/hybrid control module 148 and the engine control module 146 along with the inverter 132, energy storage system 134, and DC-DC converter system 140 communicate along a communication link as is depicted in FIG. 1.

To control and monitor the operation of the hybrid system 100, the hybrid system 100 includes an interface 150. The interface 150 includes a shift selector 152 for selecting whether the vehicle is in drive, neutral, reverse, etc., and an instrument panel 154 that includes various indicators 156 of the operational status of the hybrid system 100, such as check transmission, brake pressure, and air pressure indicators, to name just a few.

As noted before, the hybrid system 100 is configured to be readily retrofitted to existing vehicle designs with minimal impact to the overall design. All of the systems including, but not limited to, mechanical, electrical, cooling, controls, and hydraulic systems, of the hybrid system 100 have been configured to be a generally self-contained unit such that the remaining components of the vehicle do not need significant modifications. The more components that need to be modified, the more vehicle design effort and testing is required, which in turn reduces the chance of vehicle manufacturers adopting newer hybrid designs over less efficient, preexisting vehicle designs. In other words, significant modifications to the layout of a preexisting vehicle design for a hybrid retrofit require, then, vehicle and product line modifications and expensive testing to ensure the proper operation and safety of the vehicle, and this expense tends to lessen or slow the adoption of hybrid systems. As will be recognized, the hybrid system 100 not only incorporates a mechanical architecture that minimally impacts the mechanical systems of pre-existing vehicle designs, but the hybrid system 100 also incorporates a control/electrical architecture that minimally impacts the control and electrical systems of pre-existing vehicle designs.

Further details regarding the hybrid system 100 and its various subsystems, controls, components and modes of operation are described in Provisional Patent Application No. 61/381,614, filed Sep. 20, 2010, which is hereby incorporated by reference in its entirety.

Figure 2:
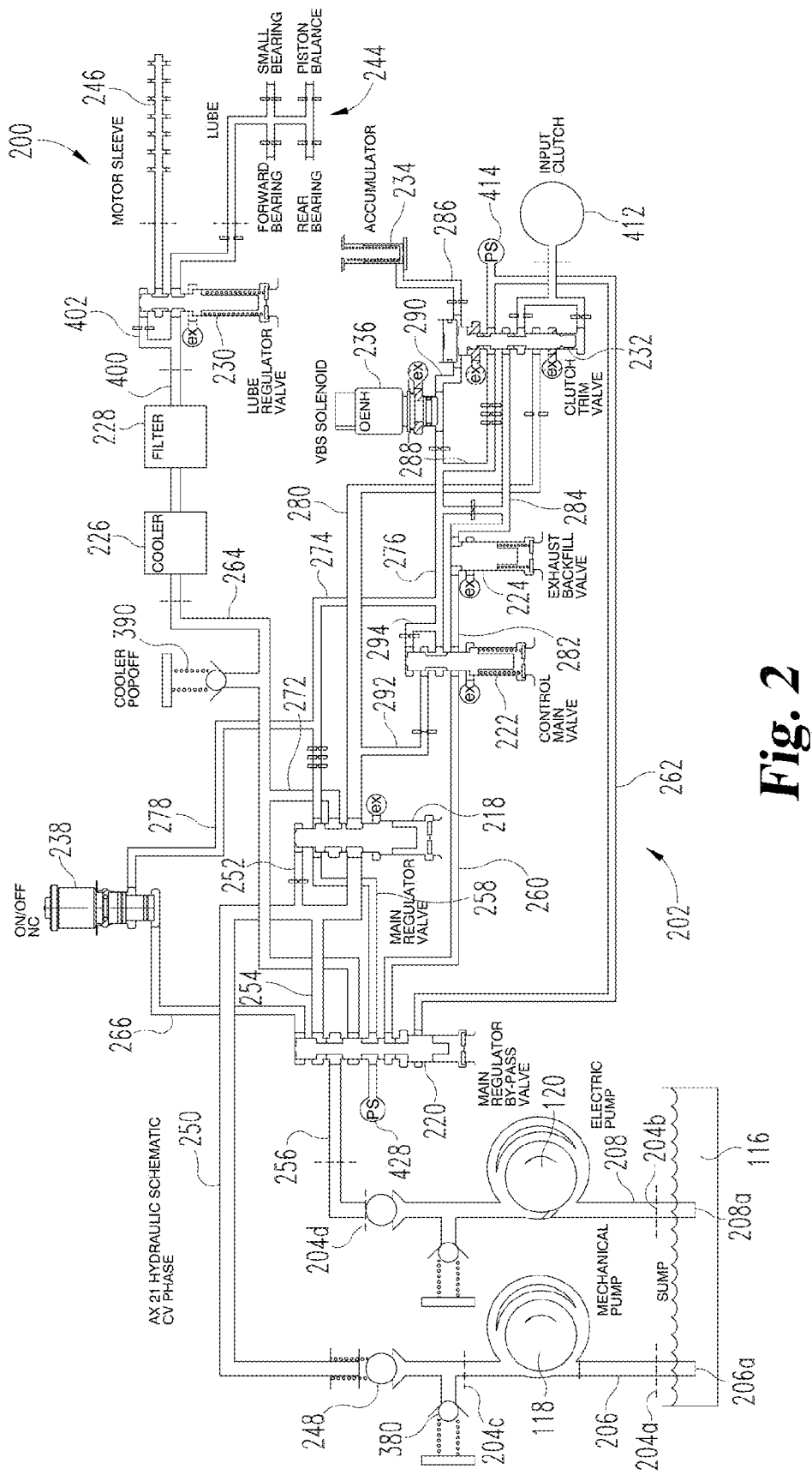
FIG. 2 illustrates a diagrammatic view of one hydraulic system suitable for use in the FIG. 1 hybrid system.

Referring to FIG. 2, there is illustrated in diagrammatic form a hydraulic system 200 which is suitably constructed and arranged for use with hybrid system 100. More particularly, hydraulic system 200 is a portion of hybrid module 104. Since the FIG. 2 illustration includes components which interface with a sump module assembly 202, broken lines 204 are used in FIG. 2 to denote, in diagrammatic form, the functional locations of the oil connections from other hydraulic components to the sump module assembly 202. Lower case letters are used in conjunction with reference numeral 204 in order to distinguish the various broken line locations (204a, 204b, etc.). For example, the sump 116 is part of the sump module assembly 202, while mechanical pump 118 and electric pump 120 are not technically considered to be actual component parts of the sump module assembly 202, through this convention is somewhat arbitrary. The mechanical pump 118 and the electric pump 120 each have an oil connection with the sump module assembly 202. Sump 116 is independent of the sump for the automatic transmission 106. Broken line 204a diagrammatically illustrates the location of flow communication between the mechanical pump inlet conduit 206 and sump 116. Similarly, broken line 204b denotes the location of flow communication between the electric pump inlet conduit 208 and sump 116. Inlet conduit 206 defines inlet conduit opening 206a. Inlet conduit 208 defines inlet conduit opening 208a.

On the flow exiting sides of the two oil pumps, broken line 204c denotes the location where the outlet 210 of mechanical pump 118 is in flow connection (and flow communication with the sump module assembly 202. Broken line 204d denotes the location where the outlet 212 of the electric pump 120 is in flow connection (and flow communication) with the sump module assembly 202. This broken line convention is used throughout the FIG. 2 illustration. However, this convention is simply for convenience in explaining the exemplary embodiment and is not intended to be structurally limiting in any manner. While the other components which have flow connections to the sump module assembly 202 are not technically considered part of the sump module assembly, these other components, such as the mechanical pump 118 and the electric pump 120, are considered part of the overall hydraulic system 200.

With continued referenced to FIG. 2, hydraulic system 200 includes a main regulator valve 218, main regulator by-pass valve 220, control main valve 222, exhaust back fill valve 224, cooler 226, filter 228, lube splitter valve 230, clutch trim valve 232, accumulator 234, solenoid 236, and solenoid 238. It will be appreciated that these identified component parts and subassemblies of hydraulic system 200 are connected with various flow conduits and that pop off valves are strategically positioned to safeguard against excessive pressure levels. Further, downstream from the lube splitter valve 230 are illustrated elements which are intended to receive oil. The first priority of the available oil at the lube splitter valve 230 is for lubrication and cooling of bearings 244 and gears or other accessories which are in need of cooling and lubrication. The second priority, once the first priority has been satisfied, is to deliver oil to motor sleeve 246.

The mechanical pump 118 is constructed and arranged to deliver oil to the main regulator valve 218 via conduit 250. One-way valve 248 is constructed and arranged for flow communication with conduit 250 and is positioned downstream from the mechanical pump 118. Valve 248 is constructed and arranged to prevent backwards flow when the engine and (accordingly) the mechanical pump are OFF. Valve 248 includes a ball and spring arrangement set at a threshold of 5 psi. Branch conduits 252 and 254 provide flow connections to the main regulator valve 218 and the main regulator by-pass valve 220, respectively. The electric pump 120 is constructed and arranged to deliver oil to the main regulator by-pass valve 220 via conduit 256. The main regulator by-pass valve 220 is in flow communication with main regulator valve 218 via conduit 258, with control main valve 222 via conduit 260, with clutch trim valve 232 via conduit 262, with cooler 226 via conduit 264 and with solenoid 238 via conduit 266.

The main regulator valve 218 is in flow communication with conduit 264 via conduit 272. Conduit 274 is in flow communication with the main regulator valve 218 and connects to conduit 276 which extends between control main valve 222 and solenoid 236. Branch conduit 278 establishes a flow path between conduit 274 and solenoid 238. Conduit 280 establishes flow communication between main regulator valve 218 and clutch trim valve 232. Conduit 282 establishes flow communication between control main valve 222 and exhaust back fill valve 224. Conduit 284 establishes flow communication between exhaust back fill valve 224 and clutch trim valve 232. Conduit 286 establishes flow communication between clutch trim valve 232 and accumulator 234. Conduit 288 establishes flow communication between clutch trim valve 232 and conduit 276. Conduit 290 establishes flow communication between solenoid 236 and clutch trim valve 232. Conduit 292 establishes a flow path (main) between conduit 280 and control main valve 222. Conduit 294 establishes a control branch flow connection between conduit 276 and control main valve 222. Other flow connections and conduits are illustrated in FIG. 2 and the corresponding flow path is readily apparent.

Considering the diagrammatic form of FIG. 2, it will be appreciated that the various flow connections and flow conduits may assume any one of a variety of forms and constructions so long as the desired oil flow can be achieved with the desired flow rate and the desired flow timing and sequence. The hydraulic system 200 description makes clear what type of oil flow is required between what components and subassemblies and the operational reason for each flow path. The hydraulic system 200 description which corresponds to what is illustrated in FIG. 2 is directed to what components and subassemblies are in oil flow communication with each other, depending on the hybrid system 100 conditions and the operational mode.

Before describing each of the three modes of operation applicable to hydraulic system 200, the relationship between and some of the construction details regarding the mechanical pump 118 and the electric pump 120 will be described. Understanding a few of the pump basics should facilitate a better understanding of the three modes of operation selected for further discussion regarding the overall hydraulic system.

Figure 3:
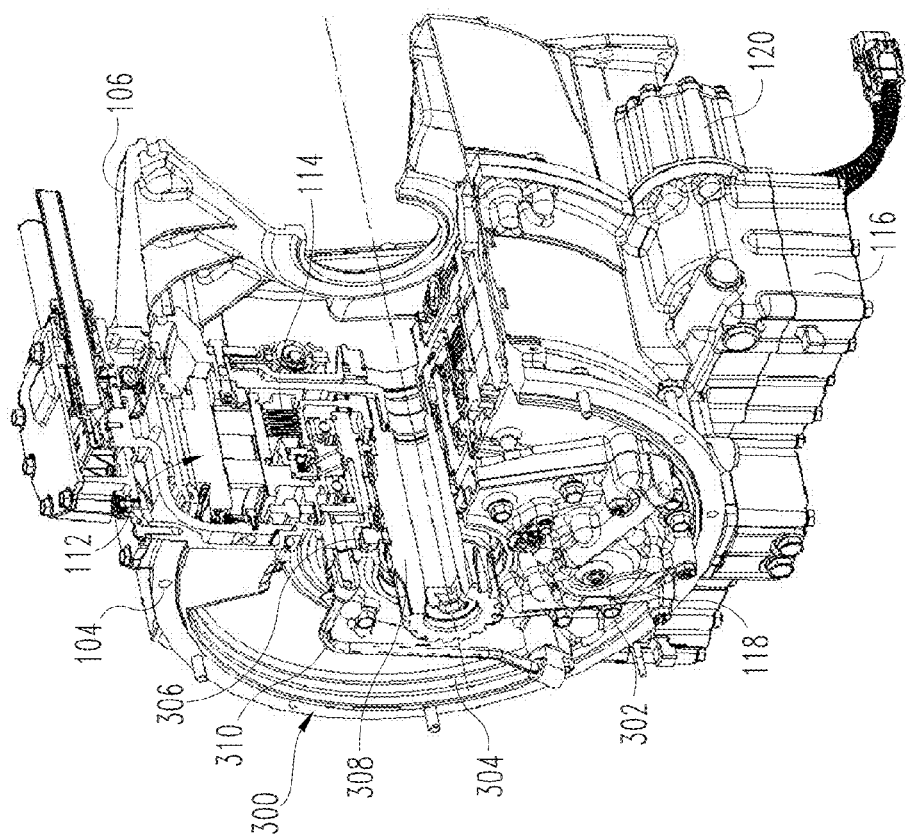
FIG. 3 is a perspective, partial cross-sectional view of a hybrid module-transmission subassembly.

Referring now to FIG. 3, a front perspective view is provided which includes a partial cross section through the hybrid module 104 from the perspective of the engine engagement side 300 of the hybrid module 104. On the engine engagement side 300, the hybrid module 104 has the mechanical pump 118 with a pump housing 302 that is secured to the hybrid module housing 304. A pump drive gear 306 which is secured to an input shaft 308 is used to drive the mechanical pump 118. The drive gear 306 in one example is secured to the input shaft 308 via a snap ring and key arrangement, but it is contemplated that the drive gear 306 can be secured in other manners. The mechanical pump 118 in conjunction with the electric pump 120 supplies fluid for lubrication, hydraulics, and/or cooling purposes to the hybrid module 104. By incorporating the electric pump 120 in conjunction with the mechanical pump 118, it should be possible for the mechanical pump 118 to be sized smaller, which in turn reduces the required space it occupies and should reduce the cost associated with the mechanical pump 118. Moreover, the electric pump 120 facilitates lubrication even when the engine 102 is OFF. This in turn facilitates electric-only operating modes as well as other modes of the hybrid system 100. Both the mechanical pump 118 and the electric pump 120 recirculate fluid from the sump 116. The fluid is then supplied to the remainder of the hybrid module 104 via holes, ports, openings and other passageways traditionally found in transmissions for circulating oil and other fluids. A clutch supply port 310 supplies oil that hydraulically applies or actuates the clutch 114. In the illustrated embodiment, the clutch supply port 310 is in the form of a tube, but is envisioned it can take other forms, such as integral passageways within the hybrid module 104, in other examples.

The operation of the hybrid system 100 involves or includes various operational modes or status conditions, also referred to herein as "system modes" or simply "modes". The principal hybrid system 100 modes are summarized in Table 1 which is provided below:

TABLE 1

SYSTEM MODES

| Mode | Clutch | Motor | PTO | Transmission |
|---|---|---|---|---|
| Engine Start | Engaged | Motor | Inoperative | Neutral |
| Charge Neutral | Engaged | Generator | Inoperative | Neutral |
| eAssist Propulsion | Engaged | Motor | Inoperative | In Gear |
| eDrive | Disengaged | Motor | Inoperative | In Gear |
| Propulsion with Charge | Engaged | Generator | Inoperative | In Gear |
| Regeneration Charging | Disengaged | Generator | Inoperative | In Gear |
| No Charge Braking | Engaged | N/A | Inoperative | In Gear |
| PTO | Engaged | N/A | Operative | Neutral |
| ePTO | Disengaged | Motor | Operative | Neutral |

During an initialization and/or startup mode, the electric pump 120 is activated by the transmission/hybrid control module 148 so as to circulate fluid through the hybrid module 104. The electric pump 120 receives its power from the energy storage system 134 via the inverter 132 (FIG. 1). Once sufficient oil pressure is achieved, the clutch 114 is engaged. At the same time or before, the PTO is inoperative or remains inoperative, and the transmission 106 is in neutral or remains in neutral. With the clutch 114 engaged, the eMachine 112 acts as a motor and in turn cranks the engine 102 in order to start (i.e., spin/crank) the engine. When acting like a motor, the eMachine 112 draws power from the energy storage system 134 via the inverter 132. Upon the engine 102 starting, the hybrid system 100 shifts to a charge neutral mode in which the fuel is on to the engine 102, the clutch 114 is engaged, and the eMachine 112 switches to a generator mode in which electricity generated by its rotation is used to charge the energy storage modules 136. While in the charge neutral mode, the transmission remains in neutral.

From the charge neutral mode, the hybrid system 100 can change to a number of different operational modes. The various PTO operational modes can also be entered from the charge neutral mode. As should be understood, the hybrid system is able to move back and forth between the various operational modes. In the charge neutral mode, the transmission is disengaged, that is, the transmission is in neutral. Referring to Table 1, the hybrid system 100 enters a propulsion assist or eAssist propulsion mode by placing the transmission 106 in gear and having the eMachine 112 act as a motor.

During the eAssist propulsion mode, a PTO module is inoperative and the fuel to the engine 102 is on. In the eAssist propulsion mode, both the engine 102 and the eMachine 112 work in conjunction to power the vehicle. In other words, the energy to power the vehicle comes from both the energy storage system 134 as well as the engine 102. While in the eAssist propulsion mode, the hybrid system 100 can then transition back to the charge neutral mode by placing the transmission 106 back into neutral and switching the eMachine 112 to a generator mode.

From the eAssist propulsion mode, the hybrid system 100 can transition to a number of different operational states. For instance, the hybrid system 100 can transition from the eAssist propulsion mode to an electrical or eDrive mode in which the vehicle is solely driven by the eMachine 112. In the eDrive mode, the clutch 114 is disengaged, and the fuel to the engine 102 is turned off so that the engine 102 is stopped. The transmission 106 is placed in a driving gear. As the eMachine 112 powers the transmission 106, the PTO module is inoperative. While in the eDrive mode, the electric pump 120 solely provides the hydraulic pressure for lubricating the hybrid module 104 and controlling the clutch 114, because the mechanical pump 118 is not powered by the stopped engine 102. During the eDrive mode, the eMachine 112 acts as a motor. To return to the eAssist propulsion mode, the electric pump 120 remains on to provide the requisite back pressure to engage the clutch 114. Once the clutch 114 is engaged, the engine 102 is spun and fuel is turned on to power the engine 102. When returning to the eAssist propulsion mode from the eDrive mode, both the eMachine 112 and the engine 102 drive the transmission 106, which is in gear.

The hybrid system 100 also has a propulsion charge mode, a regenerative braking charge mode, and a compression or engine-braking mode. The hybrid system 100 can transition to the propulsion charge mode from the charge neutral mode, the eAssist propulsion mode, the regenerative braking charge mode, or the engine-braking mode. When in the propulsion charge mode, the engine 102 propels the vehicle while the eMachine 112 acts as a generator. During the propulsion charge mode, the clutch 114 is engaged such that power from the engine 102 drives the eMachine 112 and the transmission 106, which is in gear. Again, during the propulsion charge mode, the eMachine 112 acts as a generator, and the inverter 132 converts the alternating current produced by the eMachine 112 to direct current, which is then stored in the energy storage system 134. In this mode, the PTO module is in an inoperative state. While in the propulsion charge mode, the mechanical pump 118 generally handles most of the oil pressure and lubricant needs, while the electric pump 120 provides eMachine cooling. The load between the mechanical 118 and electric 120 pumps is balanced to minimize power loss.

The hybrid system 100 can transition to a number of operational modes from the propulsion charge mode. For example, the hybrid system 100 can transition to the charge neutral mode from the propulsion charge mode by placing the transmission 106 in neutral. The hybrid system 100 can return to the propulsion charge mode by placing the transmission 106 into gear. From the propulsion charge mode, the hybrid system 100 can also switch to the propulsion assist mode by having the eMachine 112 act as an electric motor in which electricity is drawn from the energy storage system 134 to the eMachine 112 such that the eMachine 112 along with the engine 102 drive the transmission 106. The regenerative charge mode can be used to recapture some of the energy that is normally lost during braking. The hybrid system 100 can transition from the propulsion charge mode to the regenerative charge mode by simply disengaging the clutch 114. In some instances, it may be desirable to use the engine-braking mode to further slow down the vehicle and/or to reduce wear of the brakes. Transitioning to the engine-braking mode can be accomplished from the propulsion charge mode by turning off the fuel to the engine 102. During the engine-braking mode, the eMachine 112 acts as a generator. The hybrid system 100 can return to the propulsion charge mode by turning back on the fuel to the engine 102. Simply disengaging the clutch 114 will then switch the hybrid system 100 to the regenerative charging mode.

The hybrid system 100 is able to conserve energy normally lost during braking by utilizing the regenerative braking/charge mode. During the regenerative charge mode, the clutch 114 is disengaged. The eMachine 112 acts as a generator while the transmission 106 is in gear. The power from the wheels of the vehicle is transferred through the transmission 106 to the eMachine 112, which acts as a generator to reclaim some of the braking energy and in turn helps to slow down the vehicle. The recovered energy via the inverter 132 is stored in the energy storage system 134. As noted in Table 1 above, during this mode the PTO module is inoperative.

The hybrid system 100 can transition from the regenerative charge mode to any number of different operational modes. For instance, the hybrid system 100 can return to the propulsion assist mode by engaging the clutch 114 and switching the eMachine 112 to act as a motor. From the regenerative charge mode, the hybrid system 100 can also return to the propulsion charge mode by engaging the clutch 114, and switching the eMachine 112 to the generator role. The hybrid system 100 can also switch to the engine-braking mode from the regenerative charge mode by turning off the fuel to the engine 102 and engaging the clutch.

In addition to the regenerative braking mode, the hybrid system 100 can also utilize the engine-braking mode in which compression braking of the engine 102 is used to slow down the vehicle. During the engine braking mode, the transmission 106 is in gear, the PTO module is inoperative, and the eMachine 112 is acting as a generator so as to recover some of the braking energy, if so desired. However, during other variations of the engine-braking mode, the eMachine 112 does not need to act as a generator such that the eMachine 112 draws no power for the energy store system module 134. To transmit the energy from the vehicle's wheels, the engine clutch 114 is engaged and the power is then transmitted to the engine 102 while the fuel is off. In another alternative, a dual regenerative and engine braking mode can be used in which both the engine 102 and the eMachine 112 are used for braking and some of the braking energy from the eMachine 112 is recovered by the energy storage system module 134.

The hybrid system 100 can transition from the engine-braking mode to any number of different operational modes. As an example, the hybrid system 100 can switch from the engine-braking mode to the propulsion assist mode by turning on the fuel to the engine 102 and switching the eMachine 112 to act as an electric motor. From the engine-braking mode, the hybrid system 100 can also switch to the propulsion charge mode by turning back on the fuel to the engine 102. In addition, the hybrid system 100 can switch from the engine-braking mode to the regenerative charge mode by turning on the fuel to the engine 102 and disengaging the clutch 114.

When the PTO is used, the vehicle can be stationary or can be moving (e.g., for refrigeration systems). From the charge neutral mode, the hybrid system 100 enters a PTO mode by engaging the PTO. While in the PTO mode, the clutch 114 is engaged such that power from the engine 102 is transmitted to the now-operative PTO. During this PTO mode, the eMachine 112 acts as a generator drawing supplemental power from the engine 102 and transferring it via the inverter 132 to the energy storage system module 134. At the same time, the transmission 106 is in neutral so that the vehicle can remain relatively stationary, if desired. With the PTO operative, the ancillary equipment, such as the lift buckets, etc., can be used. The hybrid system 100 can return to the charge neutral mode by making the PTO inoperative.

During the PTO mode, the engine 102 is constantly running which tends to waste fuel as well as create unnecessary emissions in some work scenarios. Fuel can be conserved and emissions reduced from the hybrid system 100 by switching to an electric or ePTO mode of operation. When transitioning to the ePTO mode, the clutch 114, which transmits power from the engine 102, is disengaged and the engine 102 is stopped. During the ePTO mode, the eMachine 112 is switched to act as an electric motor and the PTO is inoperative. At the same time, the transmission 106 is in neutral and the engine 102 is stopped. Having the engine 102 turned off reduces the amount of emissions as well as conserves fuel. The hybrid system 100 can return from the ePTO mode to the PTO mode by continued operation of the electric 120 pump, engaging the clutch 114 and starting the engine 102 with the eMachine 112 acting as a starter. Once the engine 102 is started, the eMachine 112 is switched over to act as a generator and the PTO is able to operate with power from the engine 102.

With the operation or system modes of hybrid system 100 (see Table 1) in mind, the hydraulic system 200 is now further described in the context of three modes of operation. These three modes include an Electric Mode (eMode), a Transition Mode, and a Cruise Mode. From the perspective of the status and conditions of hydraulic system mode the eMode conditions are diagrammatically illustrated in FIG. 4. The Transition Mode conditions are diagrammatically illustrated in FIG. 5. The Cruise Mode conditions are diagrammatically illustrated in FIG. 6.

Figure 4:
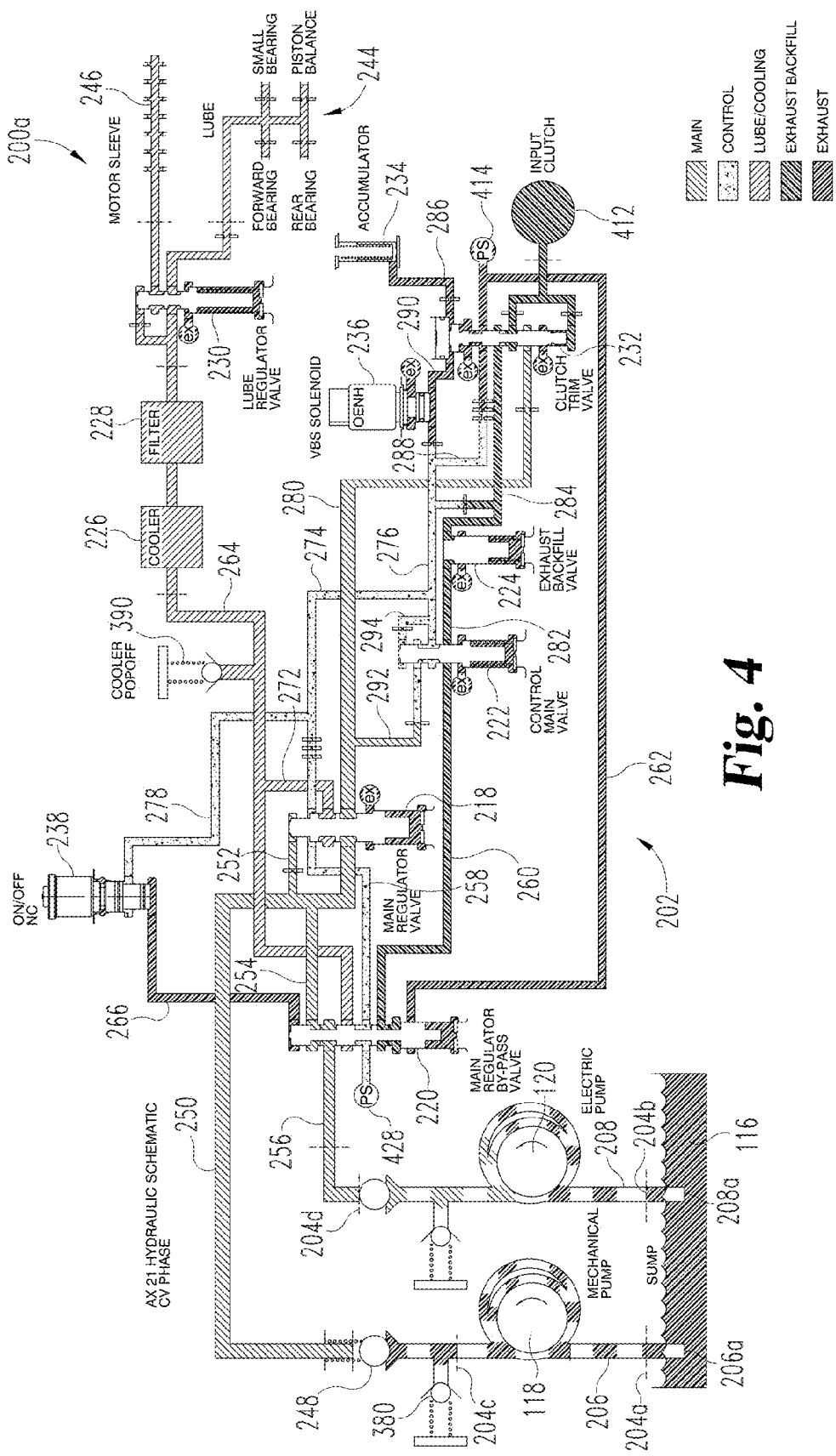
FIG. 4 illustrates a diagrammatic view of the FIG. 2 hydraulic system when the hydraulic system is in an eMode.

Referring first to FIG. 4, in the eMode condition, as represented by hydraulic system 200a, the engine and clutch are each in an "OFF" condition, and each solenoid 236 and 238 is an "OFF" condition. The electric pump 120 provides one hundred percent (100%) of the oil flow to the main regulator valve 218. With solenoid 238 in an "OFF" condition, there is no solenoid signal to the main regulator by-pass valve 220 and this component is also considered as being in an "OFF" condition. The main pressure is "knocked down" to 90 psi due to using only the electric pump 120 and considering its performance limitations. Any lube/cooling flow to the cooler 226 is the result of main regulator valve 218 overage.

Figure 5:
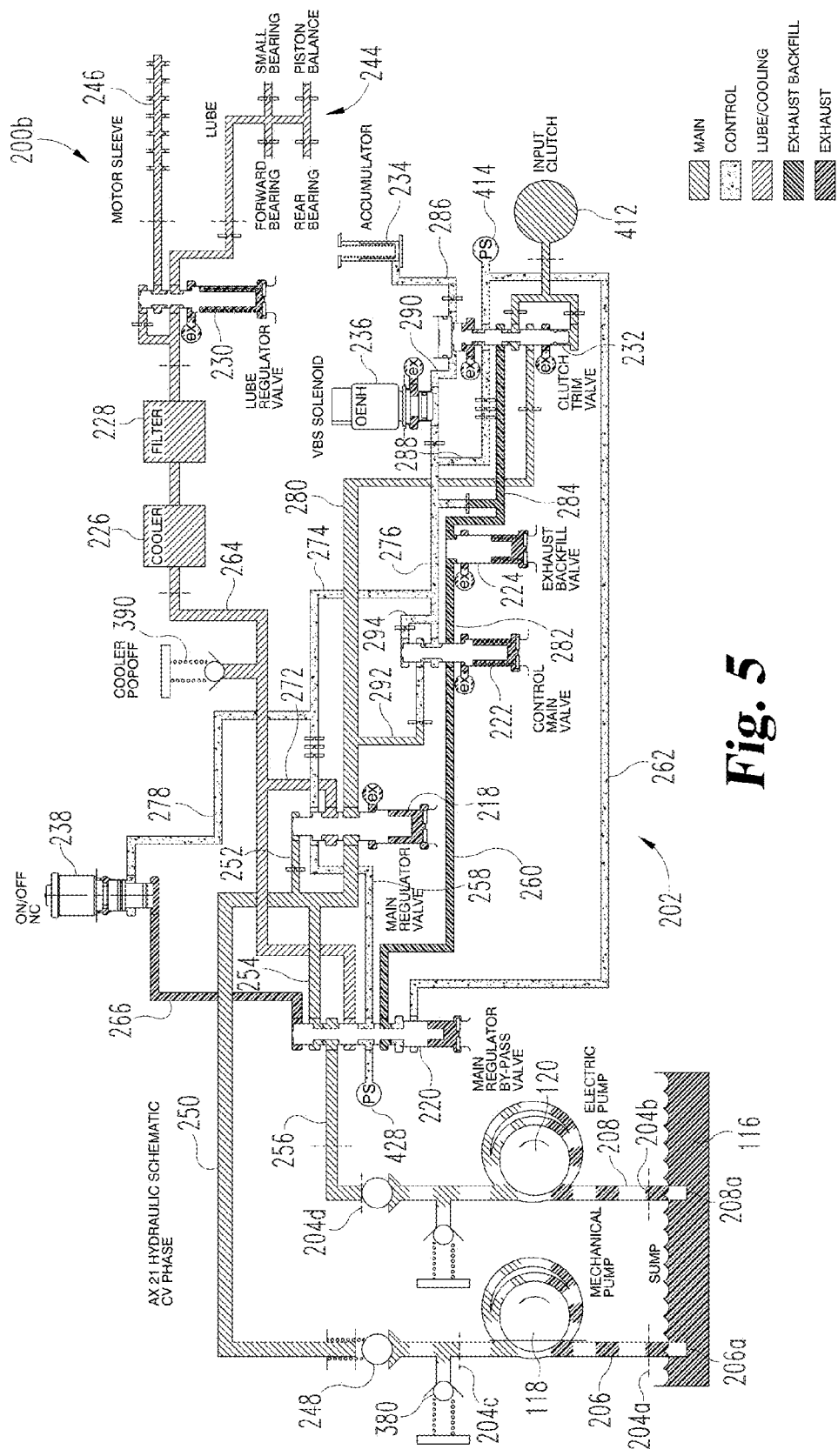
FIG. 5 illustrates a diagrammatic view of the FIG. 2 hydraulic system when the hydraulic system is in a Transition Mode.

Referring now to FIG. 5, in the Transition Mode condition as represented by hydraulic system 200b, the engine may be in either an "ON" or "OFF" condition, the clutch is in an "ON" condition, solenoid 238 is "OFF", and solenoid 236 is "ON". The electric pump 120 and the mechanical pump 118 can supply a flow of oil to the main regular valve 218. The main pressure is knocked down to 90 psi and any lube/cooling flow to the cooler 226 is the result of main regulator valve 218 overage.

Figure 6:
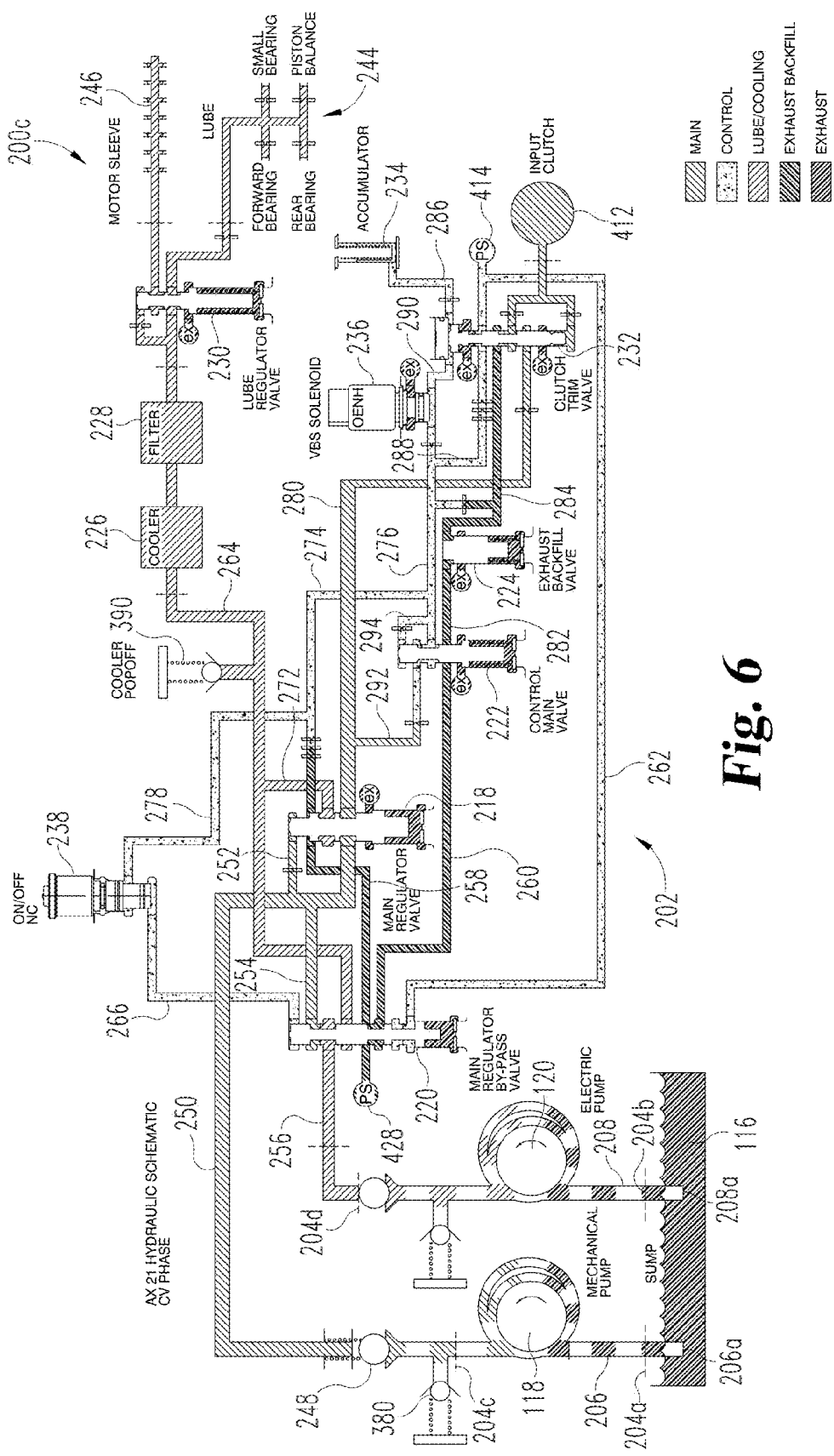
FIG. 6 illustrates a diagrammatic view of the FIG. 2 hydraulic system when the hydraulic system is in a Cruise Mode.

Referring now to FIG. 6, in the Cruise Mode, as represented by hydraulic system 200c, the engine and clutch are each in an "ON" condition, and each solenoid 236 and 238 is an "ON" condition. In this condition, the mechanical pump 118 provides one hundred percent (100%) of the oil flow to the main regulator valve 218 and to the clutch control hydraulics. The electric pump 120 provides supplemental cooler flow (or what may be referred to as cooler flow "boost"). The main pressure is at the "normal" (i.e., not knocked down) level of 205 psi. The flow to the cooler 226 is by way of the main regulator valve 218 overage and supplemented by flow from the electric pump 120.

The three modes which have been described and illustrated in FIGS. 4-6 have been identified in conjunction with hydraulic systems 200a, 200b, and 200c, respectively. This numbering scheme of letter suffixes is representative of the fact that the hardware, components, subassemblies, and conduits of hydraulic system 200 do not change with the different modes of operation. However, the operational status, the various ON/OFF conditions, etc. of the hardware, components, and subassemblies may change, depending on the particular item and the specific mode of operation.

While the three described modes for the hydraulic system 200 are based in part on the status or conditions of the engine, these modes are also based in part on the ON/OFF status of the referenced hardware, components, and subassemblies, including the mechanical pump 118 and the electric pump 120. The mechanical pump 118 is directly connected to the engine 102 such that when the engine is ON, the mechanical pump 118 is ON. When the engine 102 is OFF, the mechanical pump 118 is OFF. When ON, the mechanical pump 118 delivers oil to the entire hydraulic system. Any overage from the main regulator valve 218 is delivered to the cooler 226.

The ON/OFF status of the electric pump 120 and the speed of the electric pump 120 are controlled by the electronics of the hybrid module 104. The electric pump 120 delivers oil either to the hydraulic system 200 and/or to the cooler 226. When the mechanical pump 118 is either OFF or when its delivery of oil is insufficient, the electric pump 120 delivers oil to the hydraulic system. When the delivery of oil from the mechanical pump is sufficient, the electric pump 120 is able to be used for delivery of oil to the cooler for lube and motor cooling.

Reference has been made to the knocked down lower pressure level for certain operational modes. This knocked down pressure is associated with operation of the electric pump 120. Considering the various pressure levels and flow rates, the main pressure of the mechanical pump 118 is 205 psi. The main pressure of the electric pump 120 is 90 psi. For lube and cooling, the first 5.0 lpm of flow at approximately 30 psi is used for lube. Any excess flow up to approximately 15.0 lpm is delivered to the motor cooling sleeve 246. A maximum of 50 psi for the lube/cooling function is attained only after the motor cooling sleeve 240 is filled with oil. The clutch applied pressure is 205 psi nominal (1410 kPa) and 188 psi minimum (1300 kPa).

Figure 7:
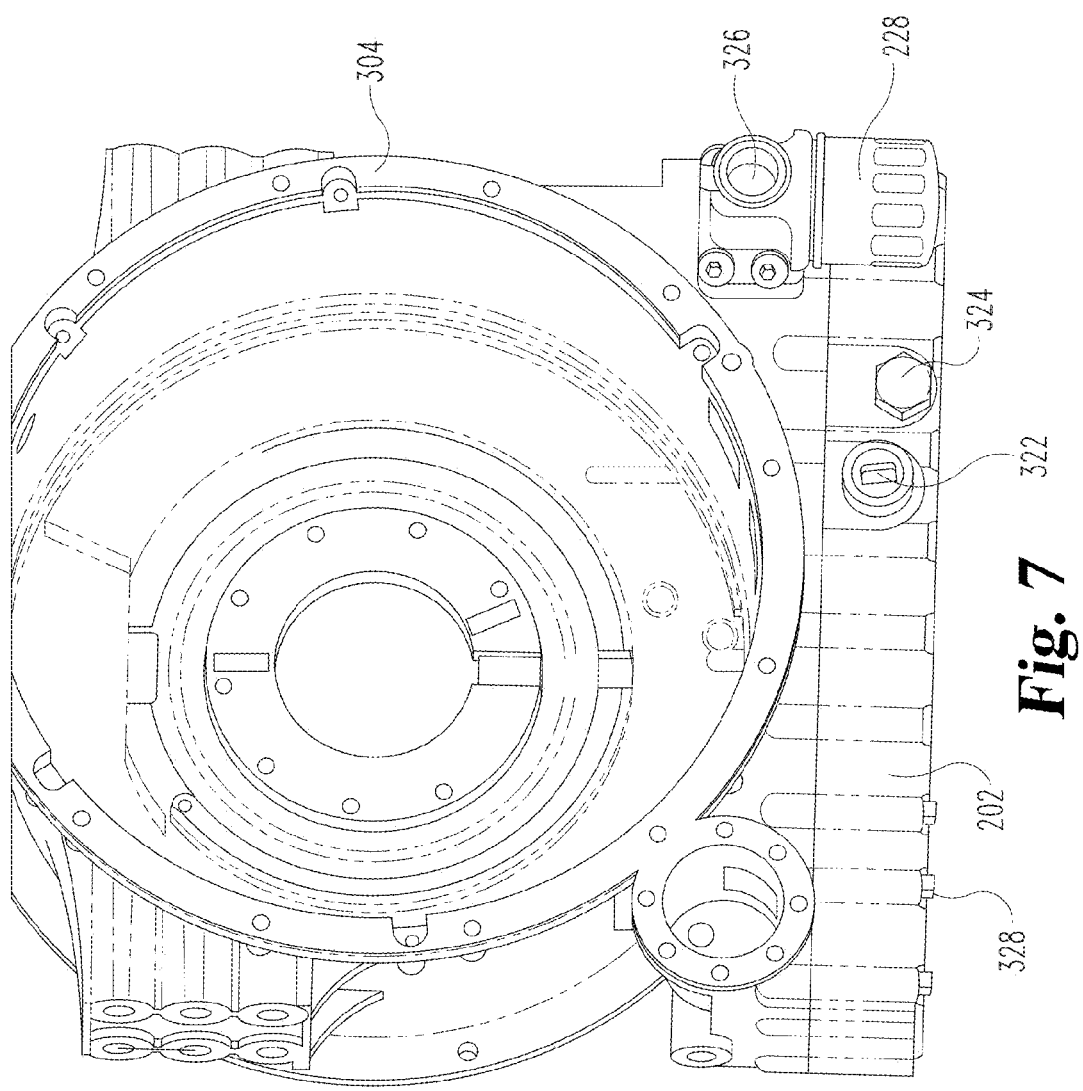
FIG. 7 is a perspective view of the connection of a sump module assembly to a hybrid module housing.
Figure 8:
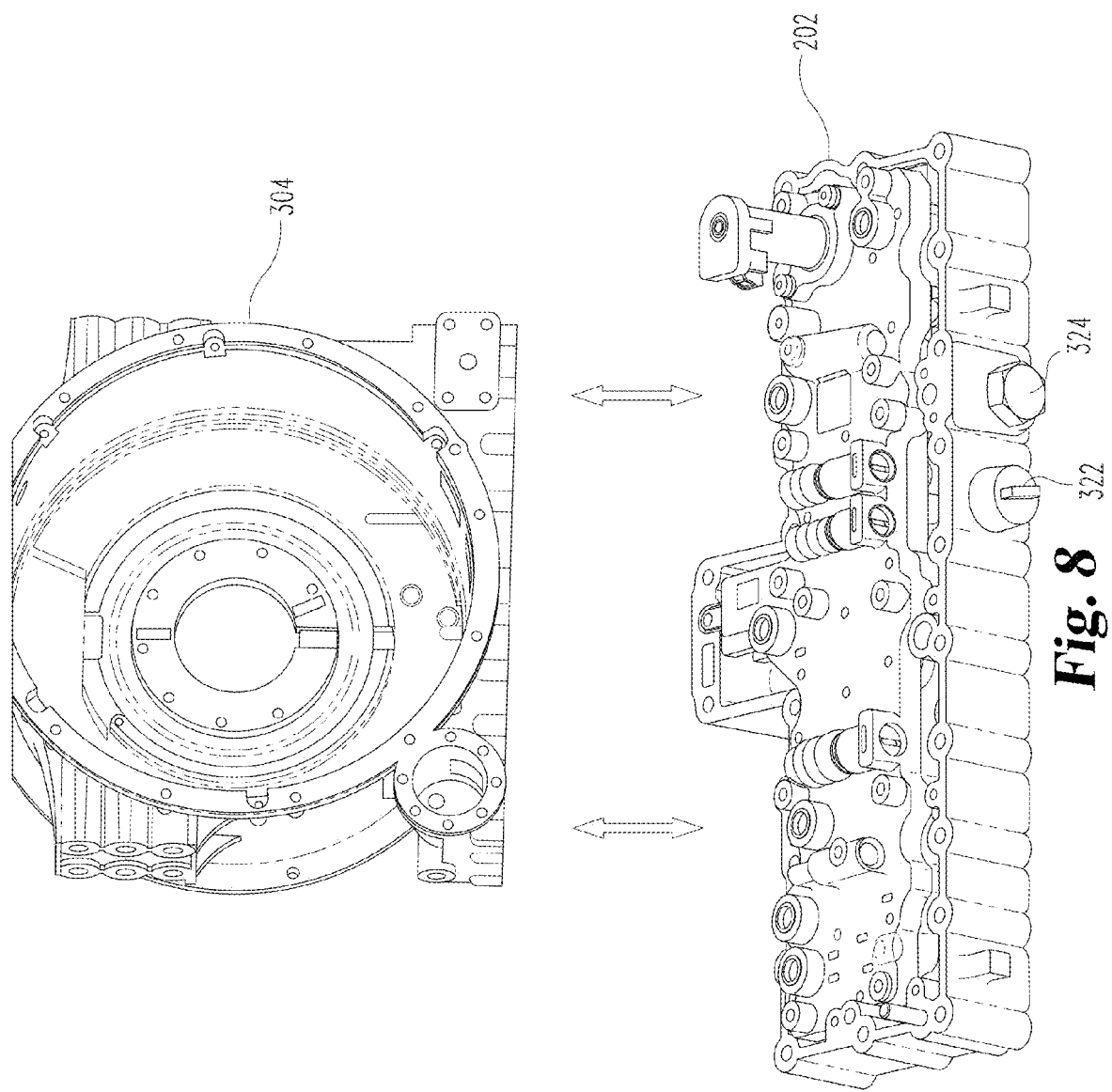
FIG. 8 is an exploded view of the FIG. 7 combination.

Referring now to FIGS. 7 and 8, the arrangement of the sump module assembly 202 relative to the hybrid module housing 304 is illustrated as connected (FIG. 7) and as an exploded view (FIG. 8). Further illustrated as part of the FIG. 7 assembly are the low voltage electric connection 322, a fluid port 324 for connecting to the cooler 226, a fluid port 326 for connection from the cooler 226 and post-cooler filter 228. The sump module assembly 202 is securely attached beneath the hybrid module housing 304 using a series of threaded fasteners 328. The exploded view of FIG. 8 illustrates some of the internal components of the sump module assembly 202 and the layout of these internal components. The details of the sump module assembly are described hereinafter with reference to other drawings.

Figure 9:
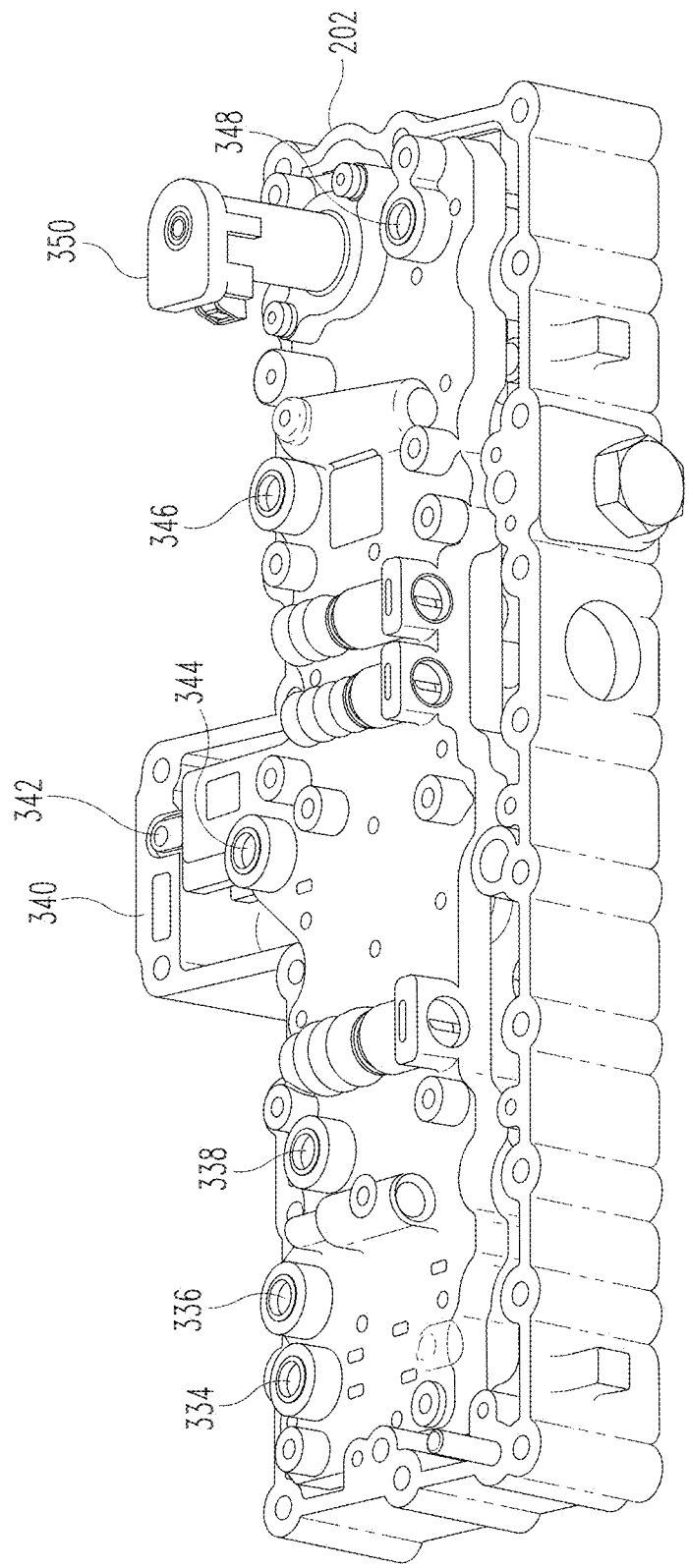
FIG. 9 is a perspective view of the sump module assembly with oil connections shown.

Referring now to FIGS. 9-12, further details regarding the sump module assembly 202 are illustrated. In FIG. 9, the various oil connections are called out. These include the electric pump pressure connection 334 and the electric pump suction connection 336. Similarly, the mechanical pump pressure connection 338 and the mechanical pump suction connection 340 are identified. Further included is the housing lube connection 342, the motor cooling connection 344, the clutch feed connection 346, and the cooler return connection 348. The oil level sensor 350, as assembled into the sump module assembly 202, is also illustrated.

Figure 10:
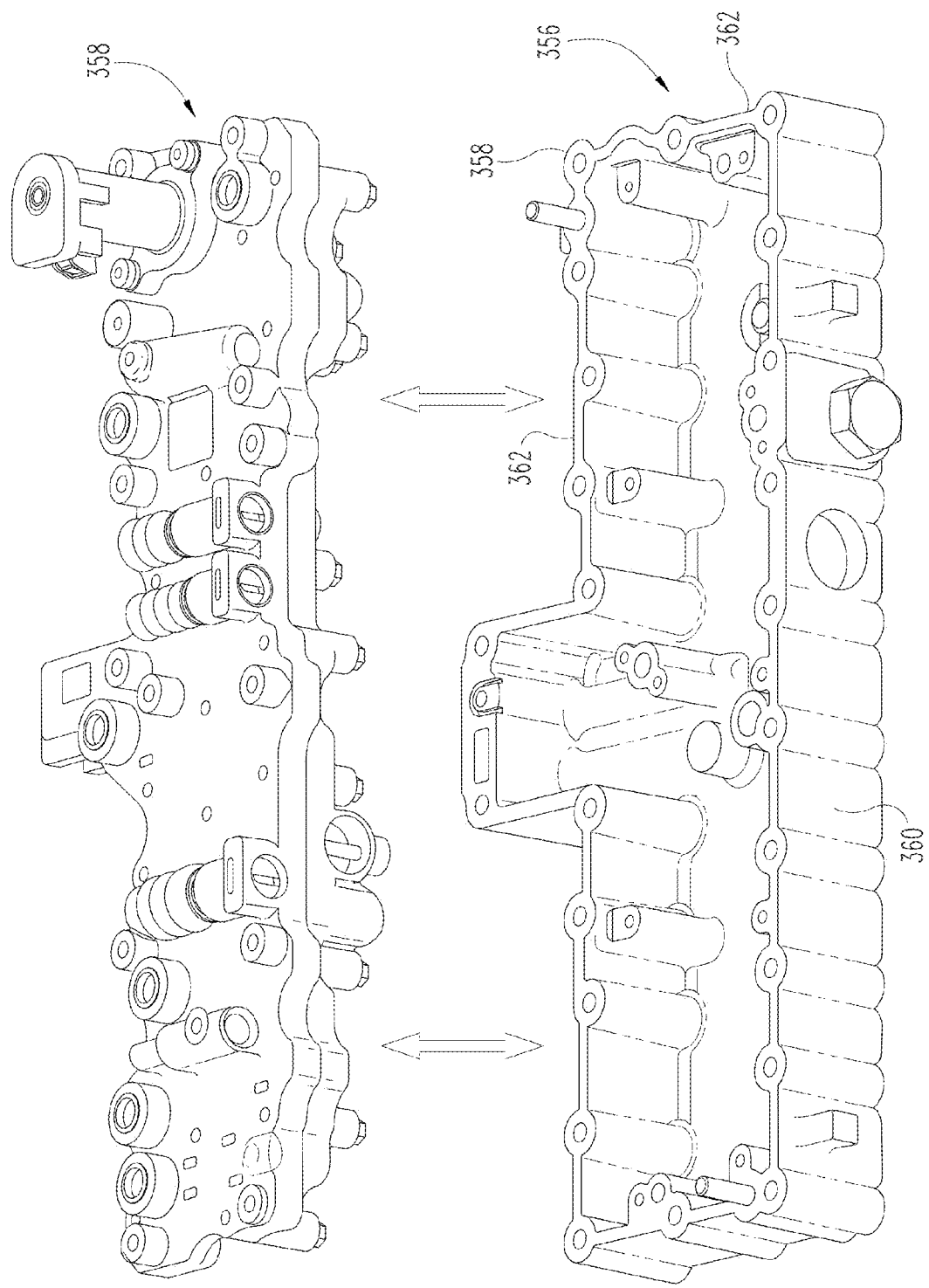
FIG. 10 is an exploded view of the FIG. 9 sump module assembly.

Referring to FIG. 10, there is an exploded view of the sump module assembly 202 showing the control module assembly 356 as separated from the sump body 358. The sump body 358 is preferably a casting with a lower surface 360 and integral sidewalls 362 so as to provide a closed receptacle or interior volume for oil.

Figure 11:
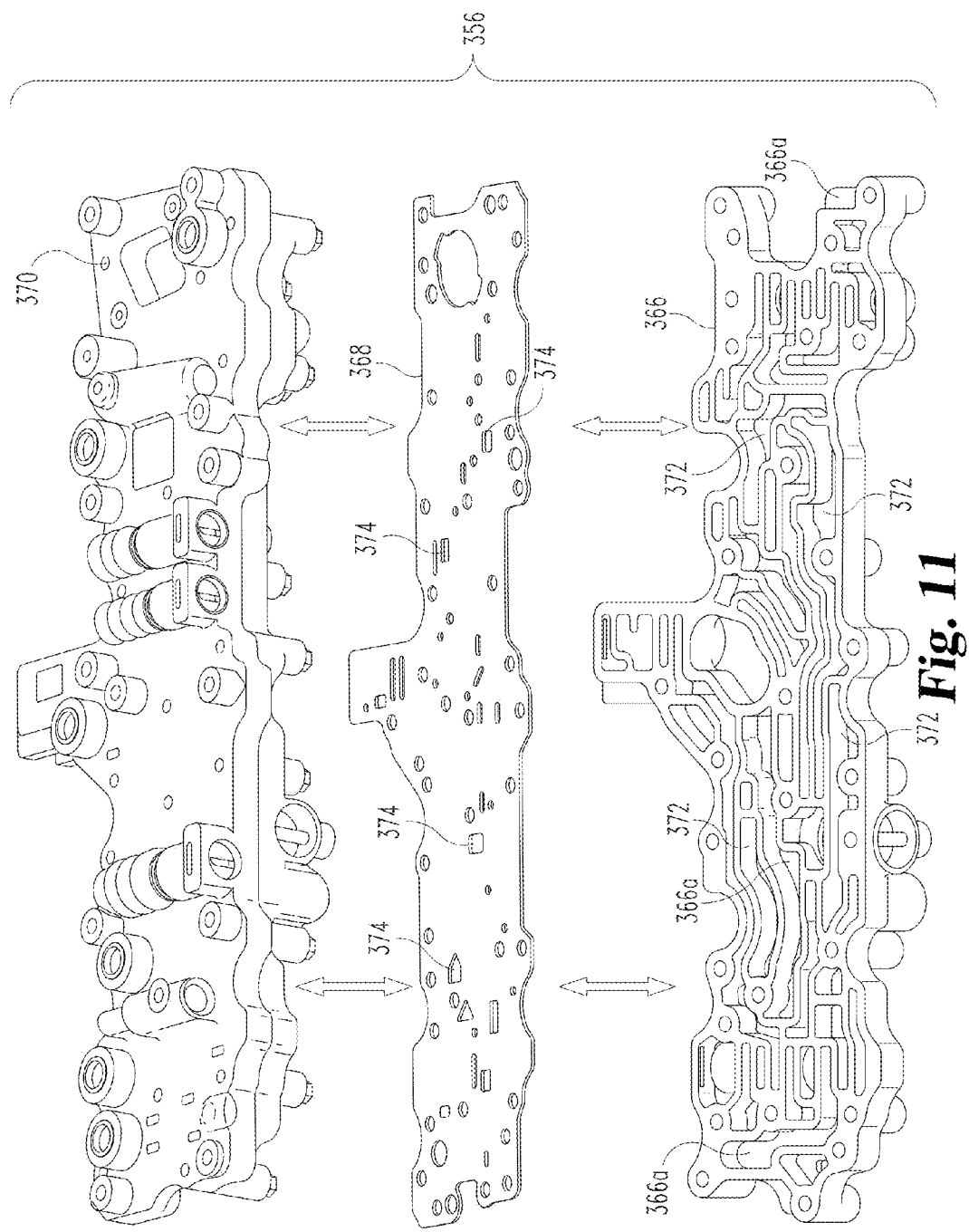
FIG. 11 is an exploded view of the control module assembly illustrated in FIG. 10.

Referring to FIG. 11, the control module assembly 356 is illustrated as an exploded view showing the three layers, including a solenoid body 366, a separator plate 368, and a main body 370. These three plate or panel-like layers are constructed and arranged and securely joined together in order to create the necessary mechanical and hydraulic connections, the desired flow paths, and compartments for the receipt of operational components.

Figure 19:
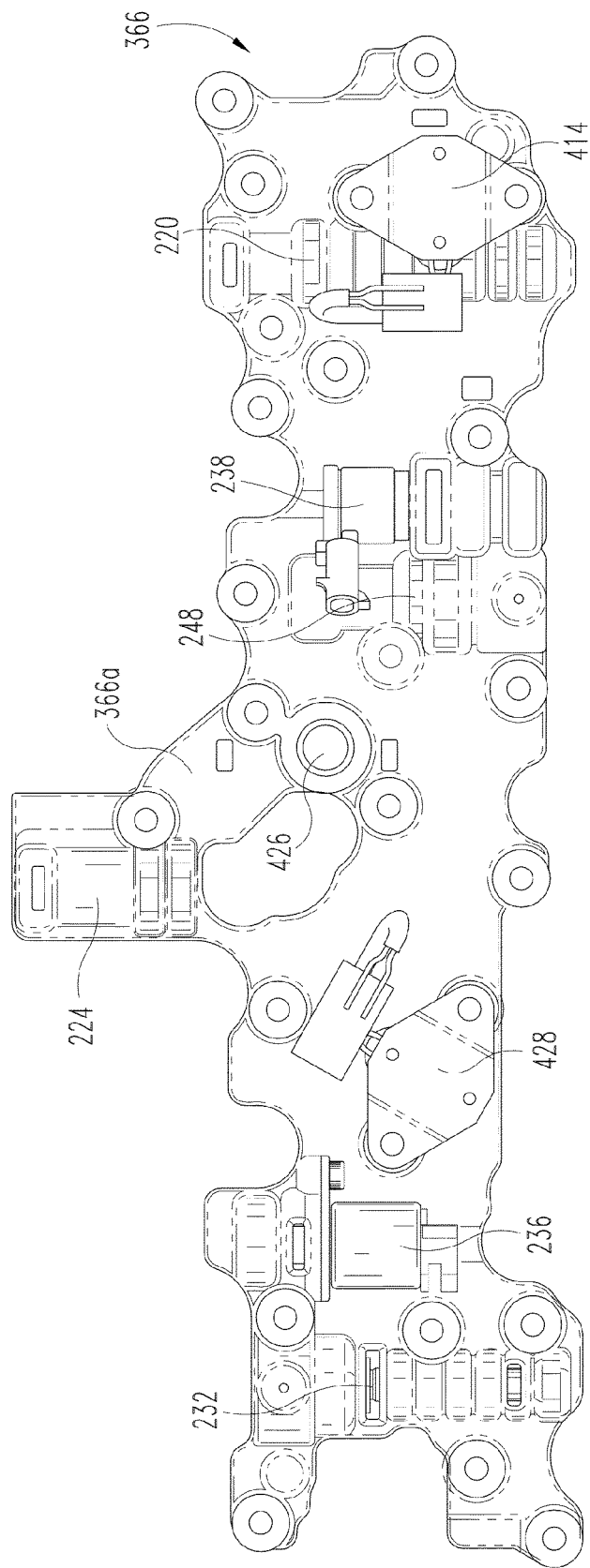
FIG. 19 is a rear elevational view of a solenoid body comprising a portion of the control module assembly illustrated in FIG. 10.

The solenoid body 366 includes a plurality of separately defined hydraulic compartments 372. In this regard it should be noted that the underside or opposite side of solenoid body 366 is not fully shown in the FIG. 11 illustration. It will be understood that the illustrated hydraulic compartments 372 are closed off in part by the bottom panel 366a of the solenoid body 366, as illustrated in FIG. 19. This bottom or back panel 366a is constructed and arranged with component compartments as described in connection with FIG. 19. The flow into and out of each hydraulic compartment 372 is affected and controlled, at least in part, by the pattern of apertures 374 defined by separator plate 368 and to a further extent by the construction and arrangement of main body 370. As will be appreciated, the solid portions or areas of the separator plate 368 are constructed and arranged to close off or cover over portions of the hydraulic compartments 372. In this way, flow into and through one or more of the hydraulic compartments is enabled, consistent with the construction and intended operation of the hydraulic system 200 disclosed herein.

Figure 12:
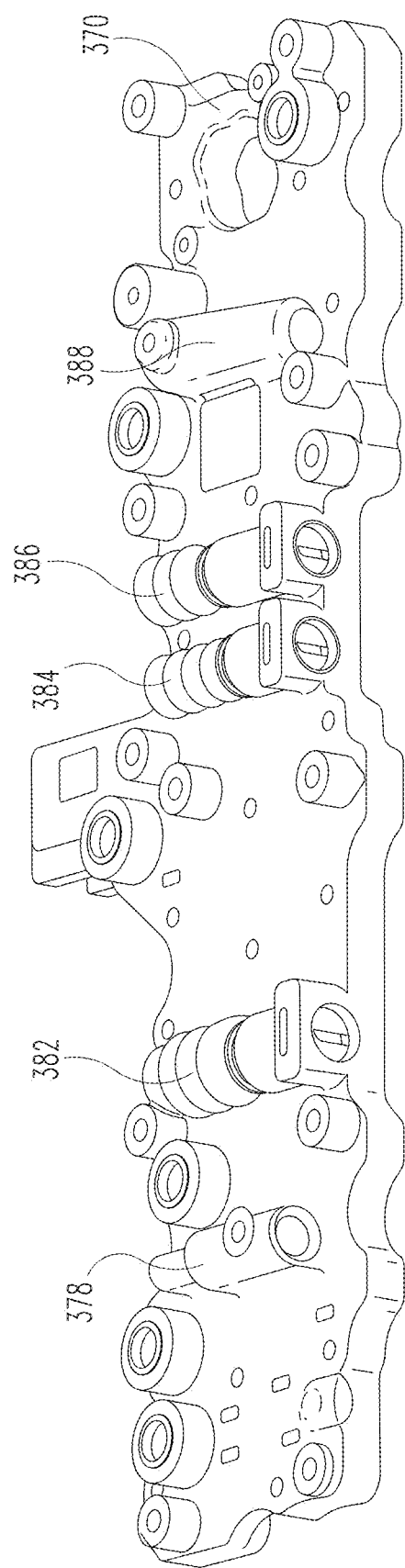
FIG. 12 is a perspective view of a main body which comprises one of the panels of the FIG. 11 control module assembly.

Referring now to FIG. 12, additional structural details of main body 370 are illustrated. As described, there are compartments for receipt of other operational components. While these other operational components may be purchased, readily-available parts, they may also be originally manufactured or custom manufactured parts, depending on the specific operational modes and parameters desired for hydraulic system 200. In the construction of main body 370, a compartment 378 is provided for receipt of a mechanical pump pop-off valve 380 (see FIG. 1). Compartment 382 is provided for receipt of the main regulator valve 218. Compartment 384 is provided for receipt of the control main valve 222. Compartment 386 is provided for the receipt of lube splitter valve 230. Compartment 388 is provided for receipt of a cooler pop-off valve 390 (see FIG. 1). Additionally, main body 370 includes various hydraulic connectors and fittings, consistent with the construction and intended operation of hydraulic system 200, as disclosed herein.

Pop-off valves 380 and 390 are similarly constructed with a ball, valve seat, and biasing spring. The mechanical pump pop-off valve 380 has a set point of 400 psi. The cooler pop-off valve 390 has a set point of 140 psi.

Referring to FIGS. 13A and 13B, the assembled combination of the sump module assembly 202 and the hybrid module housing 304 (see FIG. 7) is illustration in partial form as a front elevational view and as a side elevational view. Each view includes a broken line 392 which denotes the desired oil level.

Figure 14:
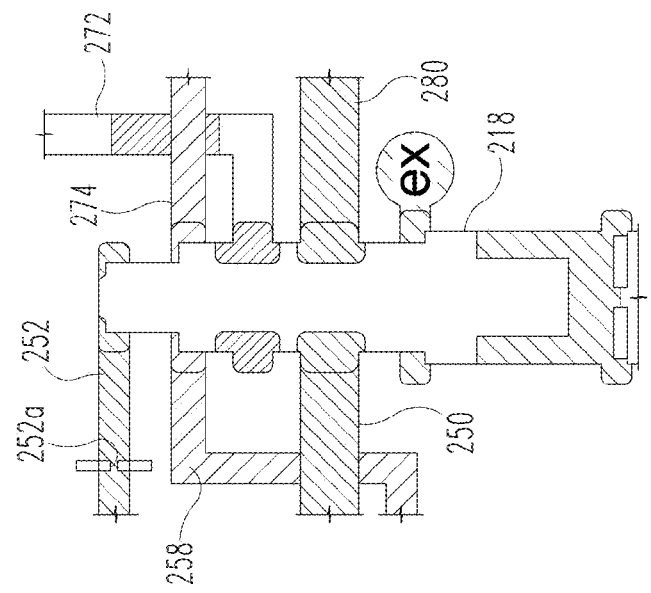
FIG. 14 is an enlarged, diagrammatic view of a main regulator valve comprising one portion of the FIG. 2 hydraulic system.

Referring now to FIG. 14, an enlarged diagrammatic illustration of the main regulator valve 218 is provided. As illustrated in FIG. 2, flow conduits 250, 252, 258, 272, 274, and 280 connect directly to main regulator valve 218. Conduit 272 is constructed and arranged to deliver a lube and cooling flow to the cooler 226. Conduit 274 is constructed and arranged to deliver a control flow to solenoids 236 and 238 and to clutch trim valve 232. Conduit 280 is constructed and arranged to deliver the main flow to control main valve 222 and to clutch trim valve 232. Conduit 252 is constructed and arranged to provide main feedback into conduit 250. Conduit 258 is constructed and arranged to connect to the main regulator by-pass valve 220. Conduit 250 is constructed and arranged to deliver the main flow into main regulator valve 218 from the mechanical pump 118.

The main regulator valve 218 is a dual regulation valve which operates in the range of 205 psi without knockdown and approximately 90 psi with knockdown. Any flow overage is sent to the cooler 226. The second regulation point goes to exhaust. Conduit 252 includes a feedback orifice 252a of approximately 1.0 mm.

Figure 15:
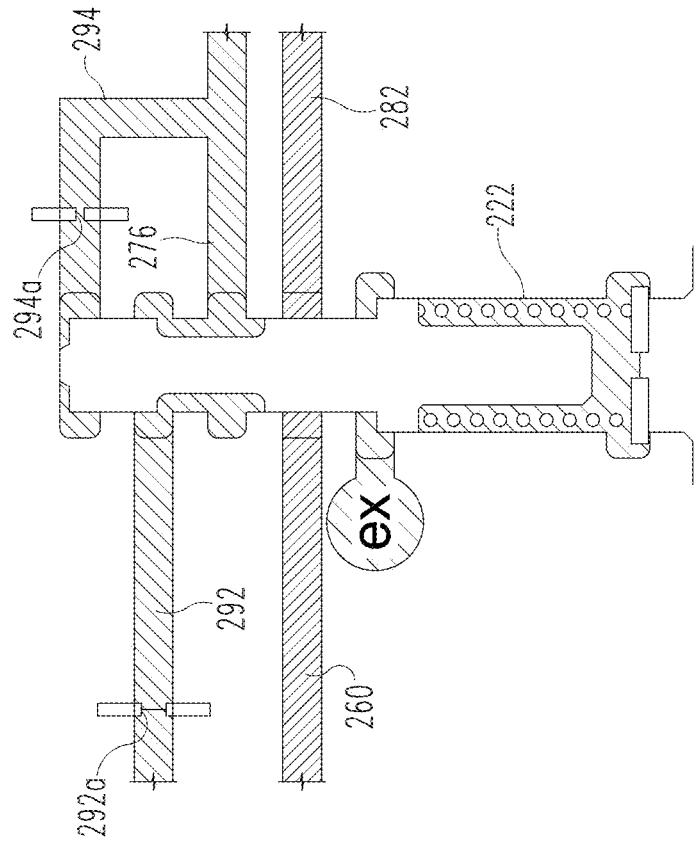
FIG. 15 is an enlarged, diagrammatic view of a control main valve comprising one portion of the FIG. 2 hydraulic system.

Referring now to FIG. 15, an enlarged diagrammatic illustration of the control main valve 222 is provided. As illustrated in FIG. 2, flow conduits 260, 276, 282, 292, and 294 connect directly to control main valve 222.

Conduit 260 is constructed and arranged to connect between the control main valve 222 and the main regulator by-pass valve 220. Conduit 282 connects the control main valve 222 to the exhaust back fill valve 224. Conduit 292 is constructed and arranged to deliver the main flow to control main valve 222 from main flow conduit 280. Control conduit 276 connects to solenoid 236 and to clutch trim valve 232 by way of conduit 290 for a control flow of oil. Conduit 288 connects the control main valve 222 to pressure switch 414. Control feedback to control main valve 222 is provided by conduit 294.

The control main valve 222 operates in the pressure regulation range of approximately 110 psi. Any flow overage is sent to the exhaust back fill valve 224. The feed orifice 292a in conduit 292 is approximately 3.0 mm. The feedback orifice 294a in conduit 294 is approximately 1.0 mm. When the pressure knock down is present (i.e., activate), the control main valve 222 acts as a flow pass through. At 90 psi, the flow is regulated by the main regulator valve 218.

Figure 16:
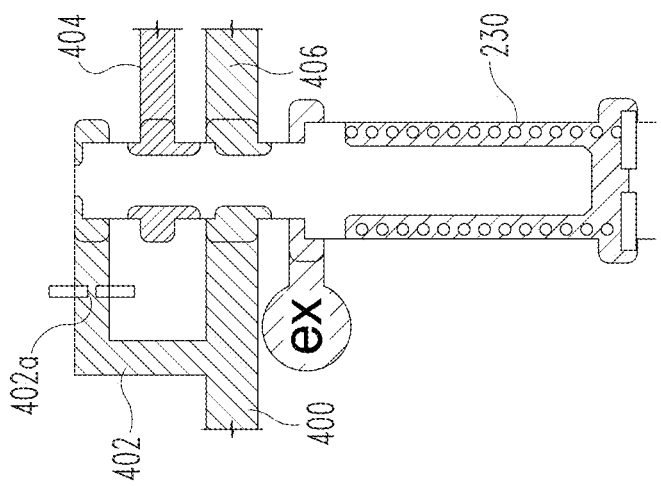
FIG. 16 is an enlarged, diagrammatic view of a lube regulation valve comprising one portion of the FIG. 2 hydraulic system.

Referring now to FIG. 16, an enlarged diagrammatic illustration of the lube regulation valve 230 is provided. As illustrated in FIG. 2, lube regulation valve 230 is positioned between the upstream filter 228 and the downstream motor sleeve 246 and bearing locations 244, as well as related components which require priority lube and cooling. Conduit 400 provides the flow connection between the filter 228 and the lube regulation valve 230. Branch conduit 402 provides lube feedback. Conduit 404 establishes a flow connection between the motor sleeve 246 and the lube regulation valve 230. Conduit 406 establishes a flow connection between those downstream components, such as bearings, which require lube and cooling, and the lube regulation valve 230.

The lube regulation valve 230, also referred to functionally as a lube splitter valve, is a dual regulation valve. The initial flow (one hundred percent (100%)) at 5.0 lpm goes to the lube requirements of the bearings 244 and related downstream components via conduit 406. At approximately 32 psi, the second flow path to the motor sleeve 246 opens via conduit 404, providing additional oil flow for motor cooling. If the motor sleeve 246 is plugged or otherwise blocked, the valve exhausts the flow at 48 psi. The feedback orifice 402a is approximately 1.0 mm.

Figure 17:
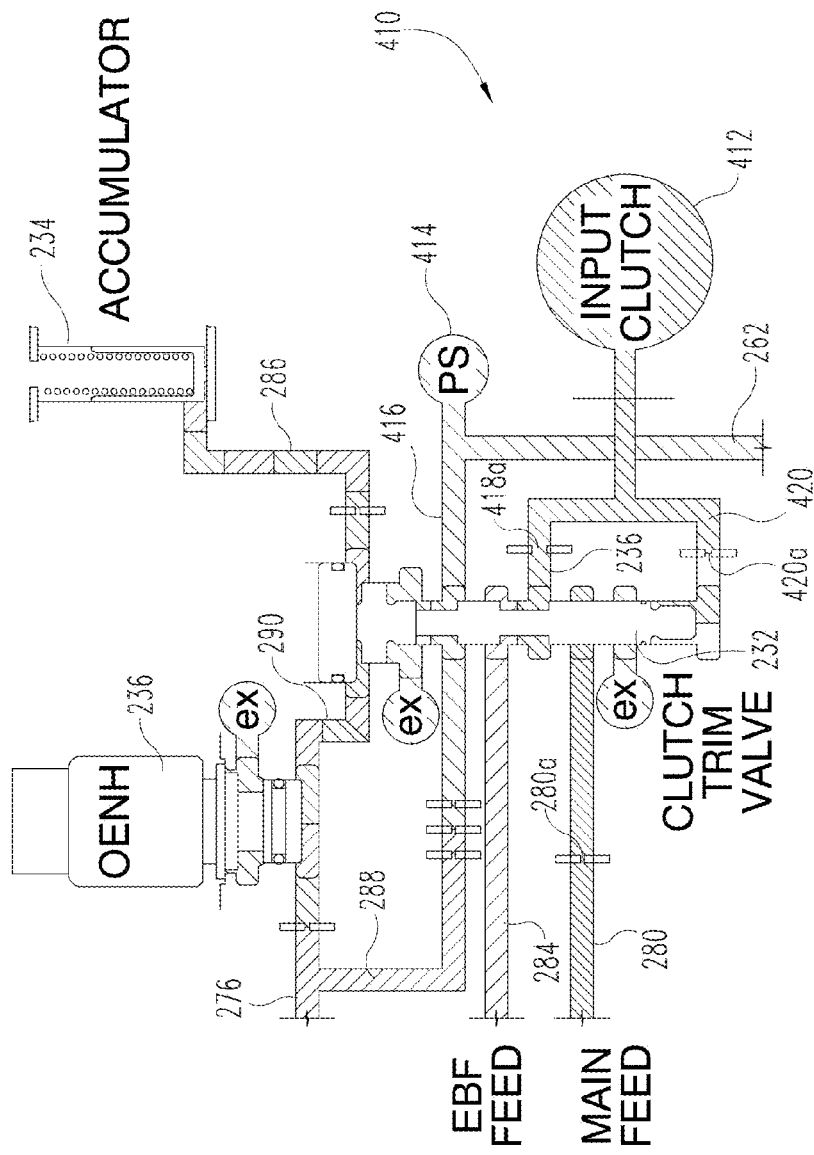
FIG. 17 is an enlarged, diagrammatic view of a clutch trim system valve comprising one portion of the FIG. 2 hydraulic system.

Referring now to FIG. 17, an enlarged diagrammatic illustration of a clutch trim system 410 is provided. Clutch trim system 410 includes clutch trim valve 232, the associated flow conduits, exhaust controls, and the input clutch 412. The conduit connections to solenoid 236 and accumulator 234 are included. Conduit 284 is constructed and arranged for flow connection between the clutch trim valve 232 and the exhaust backfill valve 224 for the exhaust backfill feed. The main feed is provided by way of conduit 280 which is constructed and arranged for flow communication between the clutch trim valve 232 and the main regulator valve 218. Pressure switch and latch input 414 is provided by way of the pressure level of the control flow in conduit 262 and connecting conduit 416. The input clutch 412 is in main flow connection with the clutch trim valve 232 by way of common conduits 418 and 420.

The clutch trim system 410 includes solenoid 236 which is a "normally high" solenoid and described functionally as a "trim" solenoid. The gain is approximately 2.83. The pressure switch 414 flips before the clutch opens to main. The regulation points include nominal, which is full main plus 15 psi, and worst case, which is approximately 190 psi. The main feed orifice 280a is approximately 4.0 mm. Clutch feed orifice 418a is approximately 3.0 mm. The feedback orifice 420a is approximately 1.0 mm.

Figure 18:
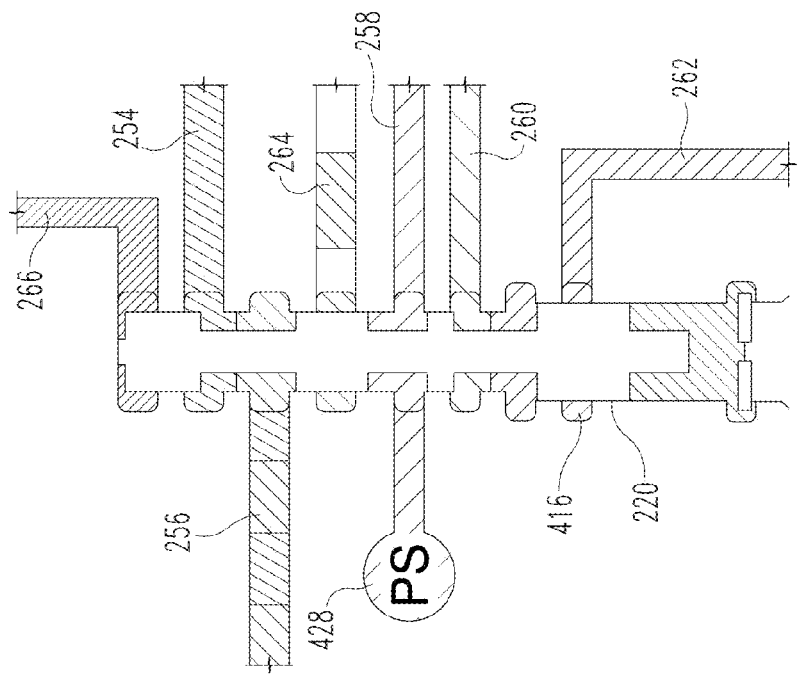
FIG. 18 is an enlarged, diagrammatic view of a main regulator by-pass valve comprising one portion of the FIG. 2 hydraulic system.

Referring to FIG. 18, an enlarged diagrammatic illustration of the main regulator by-pass valve 220 is provided. As illustrated in FIG. 2, flow conduits 254, 256, 258, 260, 262, 264, and 266 are in direct connection with main regulator by-pass valve 220. Conduit 254 connects to conduit 250 which carries the main flow from the mechanical pump 118. Conduit 256 is in flow communication with the electric pump 120. Conduit 258 is constructed and arranged for connection to main regulator valve 218 in order to establish a control flow therebetween sensed by a pressure switch. This conduit provides the knock down signal. Conduit 260 is constructed and arranged for connection to the exhaust backfill valve 224. Conduit 262 is constructed and arranged for flow connection to conduit 416 and pressure sensing by pressure switch 414. The flow by way of conduit 262 to the clutch trim valve 232 provides a latch signal. Conduit 264 is constructed and arranged for flow connection to cooler 226. Conduit 266 is constructed and arranged for flow connection to solenoid 238.

The main regulator by-pass valve 220 is used to direct the flow of oil from the electric pump 120. This valve also controls the knock down (i.e., reduced pressure). As installed, valve 220 controls the electric pump output to the main regulator valve by way of conduits 256 and 254. The knock down is active and the latch area is exhausted. In the applied (ON) position, the electric pump output is directed to the cooler 226, the knock down is exhausted, and the latch is active with the input clutch 412. With the main regulator by-pass valve down, the valve latches during a POWER OFF status and provides full clutch capacity.

The exhaust backfill valve 224 has a pressure set point of 2 psi. The flow circuit associated with valve 224 feeds the control main valve overage and the wasting pressure switches. The bleed orifice from control main valve is approximately 1.0 mm.

With reference now to FIG. 19, the back panel 366a portion of solenoid body 366 is illustrated with the assembly of various component parts therein. Included and assembled into receiving locations and compartments is the clutch trim valve 232, the trim solenoid 236, the exhaust backfill valve 224, the ON/OFF solenoid 238 for the main regulator by-pass valve 220, the main regulator by-pass valve 220, and the one-way valve 248. Also illustrated as part of pack panel 366a is a connection port 426 for the electric pump and pressure switches 428 and 414.

The basics of the hydraulic system 200 construction and the configuration having been illustrated and described, additional details regarding the component status and use, the various flows, and the control signals will now be provided relative to each of the three modes identified above.

Table 2 provides a brief summary of each mode in terms of the hydraulic status or conditions relative to the vehicle.

Cruise Mode:

This mode is defined as engine on, clutch applied & ePump output flowing to the cooler (by-passing the main regulator valve). The mode encompasses any vehicle state in which the vehicle is in idle or motion and the engine (with or without assistance from eMotor) is providing torque to the input of the transmission.

The mechanical pump flows directly to the main regulator valve (knockdown off) which regulates to a high pressure (210 psi). The logic valve is in the applied position which exhausts the knockdown (shutting it off) and also directing the ePump's flow to by-pass the main regulator and flow directly to the cooler/lube circuit.

TABLE 2

| Mode | Engine State (Mechanical Pump State) | Electric Pump State | Logic Valve (MRBV) State | Clutch Trim Valve State | Electric Pump to Supply | Clutch State |
|---|---|---|---|---|---|---|
| Electric | OFF | ON | INSTALLED | INSTALLED | MAIN PRESSURE | OPEN |
| Transition | OFF --> ON | ON | INSTALLED | INSTALLED --> APPLIED | MAIN PRESSURE | OPEN --> APPLIED |
| Cruise | ON | ON or OFF | APPLIED | APPLIED | TO COOLER | APPLIED |

Electric Mode (eMode):

This mode is defined by a steady state of engine off, clutch open, and electric pump on. Vehicle modes available are: Electric propulsion, Electric PTO mode, ReGen (engine off), etc.

In electric mode, the clutch is open therefore the engine is not connected to the transmission so therefore, torque from the sandwich to the transmission is created by the electric motor. Hydraulically, all flow and pressure is provided by the electric pump. The electric pump creates flow that flows through the MRBV to the main regulator valve. From here the hydraulic circuit and leak paths are satisfied first and the additional flow is sent to the cooler and returns to the lube valve which directs the "from cooler" oil to either lube for the housing or cooling for the motor.

The main regulator valve has a knockdown in operation so the pressure regulates at 90 psi. The knockdown is paired with the MRBV position (MRBV installed=knockdown applied, MRBV applied=knockdown unapplied) and is designed to prevent the electric pump from over pressurizing (which reduces max electric pump power requirements).

In this mode the electric pump is providing a flow at 90 psi of pressure.

Transition Mode:

This hydraulic mode encompasses a wide variety of transitional vehicle states. This state is principally defined as the ePump supplying the main regulator valve and the clutch applied. The mechanical pump can be either ON or OFF (depending upon engine state). Both pumps 118 and 120 supplying the main regulator valve means that the knockdown is still applied and the ePump is making flow at 90 psi of pressure. This also limits the clutch to 90 psi, limiting the amount of engine torque that can be transferred through the sandwich module.

Hydraulically, cooler flow, lube, and motor cooling are all provided in the same manner as in Electric Mode.

From a vehicle standpoint, this mode is used when transitioning from Engine off/Clutch off to Engine On/Clutch On. This mode is not optimal for idle or cruise of the vehicle and therefore is used only as a transition between eMode and Cruise Mode.

Hydraulically, the cooler/lube/motor cooling circuits are also supplied by overage from the main regulator valve.

From a vehicle standpoint, the clutch is applied and the engine torque is transferred through the clutch to the input of the transmission. In this mode, the eMotor can provide or absorb torque (ReGen) to/from the input of the transmission or can be shut off, effectively making the vehicle a non-hybrid.

Table 3 lists the pressure set points for the various valves and pop-off valves. The main regulator valve is listed with and without knockdown.

TABLE 3

Pressure Set Points

| Valve | Pressure (psi) | Pressure (kPa) |
|---|---|---|
| Main Regulator w/o Knockdown | 206 | 1418 |
| Main Regulator w/Knockdown | 90 | 618 |
| Control Main | 110 | 762 |
| Lube -Sleeve Opening | 32 | 224 |
| Lube - Exhaust (max press) | 48 | 329 |
| Mechanical pop-off | 400 | 2759 |
| Cooler pop-off | 141 | 970 |
| By-Pass Latch | 50 | 343 |

Filter 228 is constructed and arranged to handle the cooler return and is ninety-eight percent (98%) efficient at 32 microns. There is an internal pop-off valve structure. The suction pick up is centrally located at the sump floor.

TABLE 4

Flow Requirements

| | State 1 Clutch open Engine off Flow (lpm) | State 2 Clutch engaged Engine running Flow (lpm) | |
|---|---|---|---|
| Motor cooling (110 C.) | 8.5 | 8.5 | Based on study and modeling |
| Motor cooling | 14 | 14 | Based on study and |

TABLE 4-continued

Flow Requirements

| | State 1<br>Clutch open<br>Engine off<br>Flow (lpm) | State 2<br>Clutch engaged<br>Engine running<br>Flow (lpm) | |
|---|---|---|---|
| (120 C.) | | | modeling |
| Clutch lube | 2.5 | 2.5 | BOD-300 |
| Ball-bearing lube (x3) | 1.2 | 1.2 | Bearing supplier recommendation |
| Balance leakage | 1 | 1 | |
| Clutch apply bleed | 1.3 | 2 | |
| Misc lube | 1 | 1 | Splines, thrust bearings, etc. |
| Controls leakage | 2 | 3 | Valves and solenoids |
| Total (110 C.) | 17.5 | 19.2 | |
| Total (120 C.) | 23 | 24.7 | |
| E-pump pressure (psi) | 90 | 50 | |
| M-pump pressure (psi) | 0 | 210 | |

The main regulator valve 218, main regulator by-pass valve 220, control main valve 22, exhaust backfill valve 224, lube regulator valve 230, and clutch trim valve 232 each have a construction and arrangement which could be described, based on its construction and functionality, as a "spool valve". Each valve includes a valve body which defines an interior valve bore. Each valve also includes the use of a valve spool which is slidably disposed within the valve bore of the valve body. The selected cylindrical lands can be varied by diameter size, axial height, spacing, and relative location along the axis of the valve spool. The valve bore can also include sections with different diameters. Flow passages defined by the valve body connect to the various conduits, providing a predetermined and preselected arrangement of flow inputs and outputs, depending on incoming pressure levels and the positioning of the valve spool relative to the various flow passages. A more detailed description of this type of spool valve is provided in U.S. Pat. Nos. 7,392,892; 7,150,288; and 5,911,244. These three U.S. patent references are hereby incorporated by reference in their entirety as background technical information on the style and type of valve being used.

While the preferred embodiment of the invention has been illustrated and described in the drawings and foregoing description, the same is to be considered as illustrative and not restrictive in character, it being understood that all changes and modifications that come within the spirit of the invention are desired to be protected.

The invention claimed is:

1. A hydraulic system for a hybrid electric vehicle comprising:
   a sump containing hydraulic fluid;
   a main regulator valve;
   a main regulator by-pass valve;
   a first control solenoid;
   a second control solenoid;
   a mechanical pump constructed and arranged in fluid communication with said sump and in fluid communication with said main regulator valve for delivering hydraulic fluid from said sump to said main regulator valve;
   an electric pump constructed and arranged in fluid communication with said sump and in direct fluid communication with said main regulator by-pass valve for delivering hydraulic fluid directly from said sump to said main regulator by-pass valve; and
   wherein said main regulator valve is constructed and arranged to deliver a control flow of hydraulic fluid directly to said first control solenoid and directly to said second control solenoid.

2. The hydraulic system of claim 1 including a controller for controlling said mechanical pump and said electrical pump based on an operational mode of the hybrid electric vehicle.

3. The hydraulic system of claim 2 wherein the hybrid electric vehicle has three operational modes associated with the hydraulic system, including an eMode, a transition mode and a cruise mode.

4. The hydraulic system of claim 1 wherein said first control solenoid is constructed and arranged in fluid communication with said main regulator by-pass valve.

5. The hydraulic system of claim 1 which further includes a clutch trim valve.

6. The hydraulic system of claim 5 wherein said second control solenoid is constructed and arranged in fluid communication with said clutch trim valve.

7. The hydraulic system of claim 6 wherein said first control solenoid and said second control solenoid each have an operational condition which is determined based on the hybrid electric vehicle being in one of three operational modes.

8. The hydraulic system of claim 5 wherein said clutch trim valve is constructed and arranged as a spool valve.

9. A hydraulic system for a hybrid electric vehicle comprising:
   a sump containing hydraulic fluid;
   a main regulator valve;
   a main regulator by-pass valve which is constructed and arranged to be operable in a first condition for control of fluid to said main regulator valve and in a second condition for control of fluid flow to a downstream fluid need;
   a mechanical pump constructed and arranged in fluid communication with said sump and in fluid communication with said main regulator valve for delivering hydraulic fluid from said sump to said main regulator valve; and
   an electric pump constructed and arranged in fluid communication with said sump and in fluid communication with said main regulator by-pass valve for delivering hydraulic fluid from said sump to said main regulator by-pass valve.

10. The hydraulic system of claim 9 which further includes first and second control solenoids.

11. The hydraulic system of claim 10 wherein said first control solenoid is constructed and arranged in fluid communication with said main regulator by-pass valve.

12. The hydraulic system of claim 9 which further includes a control solenoid and a clutch trim valve.

13. The hydraulic system of claim 12 wherein said control solenoid is constructed and arranged in fluid communication with said clutch trim valve.

14. The hydraulic system of claim 9 wherein said downstream fluid need is a cooler.

15. The hydraulic system of claim 9 wherein the hybrid electric vehicle has three operational modes, including an eMode, a transition mode and a cruise mode.

16. A hydraulic system for a hybrid electric vehicle comprising:
   a sump containing hydraulic fluid;

a main regulator valve;
a main regulator by-pass valve;
a mechanical pump constructed and arranged in fluid communication with said sump and in fluid communication with said main regulator valve for delivering hydraulic fluid from said sump to said main regulator valve; and
an electric pump constructed and arranged in fluid communication with said sump and in fluid communication with said main regulator by-pass valve for delivering hydraulic fluid from said sump to said main regulator by-pass valve, wherein said hybrid electric vehicle includes a hybrid module housing and said sump is constructed and arranged as a sump module assembly which is positioned beneath said hybrid module housing, and wherein said sump module assembly includes a control module assembly and a sump body.

17. The hydraulic system of claim 16 wherein said control module assembly is constructed and arranged in three layers including a solenoid body, a separator plate and a main body.

18. The hydraulic system of claim 17 wherein said solenoid body is constructed and arranged with a plurality of separately defined hydraulic compartments.

19. A hydraulic system for a hybrid electric vehicle comprising:
a sump containing hydraulic fluid;
a main regulator valve;
a main regulator by-pass valve;
a clutch trim valve which is constructed and arranged as a spool valve;
a mechanical pump constructed and arranged in fluid communication with said sump and in fluid communication with said main regulator valve for delivering hydraulic fluid from said sump to said main regulator valve; and
an electric pump constructed and arranged in fluid communication with said sump and in fluid communication with said main regulator by-pass valve for delivering hydraulic fluid from said sump to said main regulator by-pass valve; and
first and second control solenoids, wherein said hybrid electric vehicle has three operational modes associated with said hydraulic system, wherein said first control solenoid and said second control solenoid each have an operational condition which is determined by which of the three operational modes represents the operational mode of the hybrid electric vehicle, wherein said main regulator valve is constructed and arranged to deliver a control flow of hydraulic fluid directly to said first control solenoid and directly to said second control solenoid.

20. The hydraulic system of claim 19 wherein said main regulator valve is constructed and arranged to deliver a control flow of fluid to said first control solenoid and to said second control solenoid.

21. The hydraulic system of claim 19 wherein said three operational modes include an eMode, a transition mode and a cruise mode.

22. A hydraulic system for a hybrid electric vehicle comprising:
a sump containing hydraulic fluid;
a main regulator valve;
a main regulator by-pass valve;
a clutch trim valve which is constructed and arranged as a spool valve;
a mechanical pump constructed and arranged in fluid communication with said sump and in fluid communication with said main regulator valve for delivering hydraulic fluid from said sump to said main regulator valve; and
an electric pump constructed and arranged in fluid communication with said sump and in fluid communication with said main regulator by-pass valve for delivering hydraulic fluid from said sump to said main regulator by-pass valve, wherein the hybrid electric vehicle has three operational modes associated with the hydraulic system, including an eMode, a transition mode and a cruise mode, wherein said main regulator valve is constructed and arranged to deliver a control flow of hydraulic fluid directly to said first control solenoid and directly to said second control solenoid.

23. The hydraulic system of claim 22 wherein when said hybrid electric vehicle is in said eMode, a first control solenoid is in an OFF operational condition and a second control solenoid is in an OFF operational condition.

24. The hydraulic system of claim 23 wherein when said hybrid electric vehicle is in said eMode, all of the hydraulic fluid which is delivered from the sump to said main regulator valve and/or said main regulator by-pass valve and/or said clutch trim valve is delivered by said electric pump.

25. The hydraulic system of claim 22 wherein when said hybrid electric vehicle is in said transition mode, a first control solenoid is in an OFF operational condition and a second control solenoid is in an ON operational condition.

26. The hydraulic system of claim 25 wherein when said hybrid electric vehicle is in said transition mode, the hydraulic fluid which is delivered from the sump to any of the valves of the hydraulic system is delivered in apportioned amounts by said electric pump and by said mechanical pump.

27. The hydraulic system of claim 22 wherein when said hybrid electric vehicle is in said cruise mode, a first control solenoid is in an ON operational condition and a second control solenoid is in an ON operational condition.

28. The hydraulic system of claim 27 wherein when said hybrid electric vehicle is in said cruise mode, all of the hydraulic fluid which is delivered from the sump to said main regulator valve and/or said main regulator by-pass valve and/or said clutch trim valve is delivered by said mechanical pump.

29. A hydraulic system for a hybrid electric vehicle comprising:
a sump containing hydraulic fluid;
a main regulator valve;
a main regulator by-pass valve;
a clutch trim valve which is constructed and arranged as a spool valve;
a first pump in fluid communication with said sump and being constructed and arranged for supplying fluid to said main regulator by-pass valve, said main regulator valve having two pressure states which are determined by a fluid input from said main regulator by-pass valve; and
a second pump constructed and arranged in fluid communication with said sump and in direct fluid communication with said main regulator valve for delivering hydraulic fluid directly from said sump to said main regulator valve.

30. The hydraulic system of claim 29 wherein said first pump is an electric pump and wherein said second pump is a mechanical pump.

31. The hydraulic system of claim 30 including a controller for controlling said first pump and said second pump based on an operational mode of the hybrid electric vehicle.

32. The hydraulic system of claim 31 wherein the hybrid electric vehicle has three operational modes associated with the hydraulic system, including an eMode, a transition mode and a cruise mode.

33. A hydraulic system for a hybrid electric vehicle comprising:
   a sump containing hydraulic fluid;
   a main regulator valve;
   a main regulator by-pass valve;
   a clutch trim valve which is constructed and arranged as a spool valve;
   a mechanical pump constructed and arranged in fluid communication with said sump and in fluid communication with said main regulator valve for delivering hydraulic fluid from said sump to said main regulator valve; and
   an electric pump constructed and arranged in fluid communication with said sump and in fluid communication with said main regulator by-pass valve for delivering hydraulic fluid from said sump to said main regulator by-pass valve, wherein the hybrid electric vehicle has three operational modes associated with the hydraulic system, including an eMode, a transition mode and a cruise mode, wherein when said hybrid electric vehicle is in said eMode, a first control solenoid is in an OFF operational condition and a second control solenoid is in an OFF operational condition.

34. A hydraulic system for a hybrid electric vehicle comprising:
   a sump containing hydraulic fluid;
   a main regulator valve;
   a main regulator by-pass valve;
   a clutch trim valve which is constructed and arranged as a spool valve;
   a mechanical pump constructed and arranged in fluid communication with said sump and in fluid communication with said main regulator valve for delivering hydraulic fluid from said sump to said main regulator valve; and
   an electric pump constructed and arranged in fluid communication with said sump and in fluid communication with said main regulator by-pass valve for delivering hydraulic fluid from said sump to said main regulator by-pass valve, wherein the hybrid electric vehicle has three operational modes associated with the hydraulic system, including an eMode, a transition mode and a cruise mode, wherein when said hybrid electric vehicle is in said transition mode, a first control solenoid is in an OFF operational condition and a second control solenoid is in an ON operational condition.

35. A hydraulic system for a hybrid electric vehicle comprising:
   a sump containing hydraulic fluid;
   a main regulator valve;
   a main regulator by-pass valve;
   a clutch trim valve which is constructed and arranged as a spool valve;
   a mechanical pump constructed and arranged in fluid communication with said sump and in fluid communication with said main regulator valve for delivering hydraulic fluid from said sump to said main regulator valve; and
   an electric pump constructed and arranged in fluid communication with said sump and in fluid communication with said main regulator by-pass valve for delivering hydraulic fluid from said sump to said main regulator by-pass valve, wherein the hybrid electric vehicle has three operational modes associated with the hydraulic system, including an eMode, a transition mode and a cruise mode, wherein when said hybrid electric vehicle is in said cruise mode, a first control solenoid is in an ON operational condition and a second control solenoid is in an ON operational condition.

* * * * *